United States Patent [19]

Ogawa et al.

[11] Patent Number: 5,715,397
[45] Date of Patent: Feb. 3, 1998

[54] SYSTEM AND METHOD FOR DATA TRANSFER AND PROCESSING HAVING INTELLIGENT SELECTION OF PROCESSING ROUTING AND ADVANCED ROUTING FEATURES

[75] Inventors: Stuart S. Ogawa, San Francisco, Calif.; Kevin R. Pierce, Fairview, N.J.

[73] Assignee: Autoentry Online, Inc., San Jose, Calif.

[21] Appl. No.: 349,022

[22] Filed: Dec. 2, 1994

[51] Int. Cl.$^6$ .................................................. G06F 13/00
[52] U.S. Cl. .......................... 395/200.18; 395/200.15; 370/420
[58] Field of Search ............... 395/200.01, 200.02, 395/200.09, 200.1, 200.2, 828, 835, 412, 200.08, 200.15, 200.18, 840, 841, 851, 855, 858; 364/222.2, 239, 242.94, 249.96, 242.5; 370/278, 282, 351, 431, 464, 420, 421; 340/825.03, 826, 827

[56] References Cited

U.S. PATENT DOCUMENTS

| | | | |
|---|---|---|---|
| 4,951,196 | 8/1990 | Jackson | 364/401 |
| 5,054,096 | 10/1991 | Beizer | 382/41 |
| 5,119,465 | 6/1992 | Jack et al. | 395/500 |
| 5,257,369 | 10/1993 | Skeen et al. | 395/650 |
| 5,416,917 | 5/1995 | Adair et al. | 395/500 |

*Primary Examiner*—Alpesh M. Shah
*Attorney, Agent, or Firm*—R. Michael Ananian; Flehr Hohbach Test Albritton & Herbert LLP

[57] ABSTRACT

Method, system, and apparatus are described for automatically receiving, at an intermediate processing location, data from a wide variety of remote sources, identifying the format of the data, translating the data to a common file format, sending the data to a recipient in an intermediate format, then translating the data to the specific format needed by the particular recipient. The system operates automatically with little human intervention. A unique system for automatically selecting and implementing specific translation modules is also described. Error checking features ensure that the transferred data matches the original data although the format is altered, and documentary receipts are sent to each section of the system that sends data, and logical, statistical and mathematical operations may be performed on the data. The system utilizes internal databases which allows it to know what format data will arrive in, what format to translate it to, and how many transactions to bill a data-receiving subscriber for. The system performs data translation and transfer, and performs validation, exception reporting, data analysis, and generates and sends receipts. Some or all such data processing may alternatively be performed at one or both of the data source and the data destination, without an intermediate processing location. A provider data file may also be prepared from a scanner, such as a fax transmission, which provides image data which are processed in order to derive the data file.

32 Claims, 15 Drawing Sheets

Figure 2A

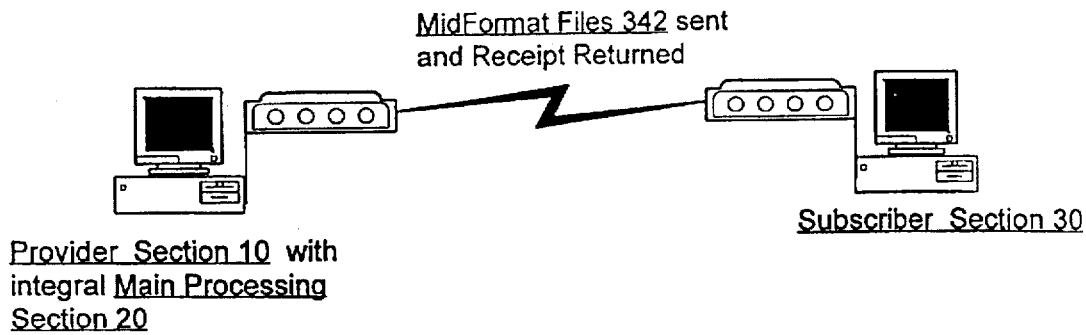

MidFormat Files 342 sent and Receipt Returned

Provider Section 10 with integral Main Processing Section 20

Subscriber Section 30

Figure 2B

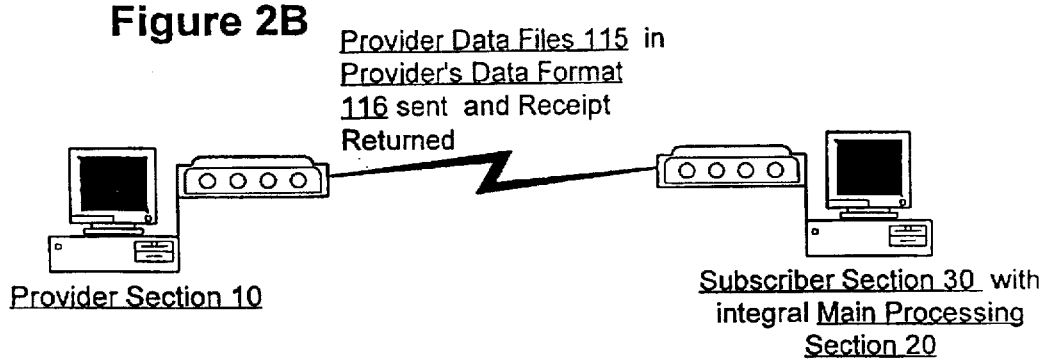

Provider Data Files 115 in Provider's Data Format 116 sent and Receipt Returned

Provider Section 10

Subscriber Section 30 with integral Main Processing Section 20

Figure 2C

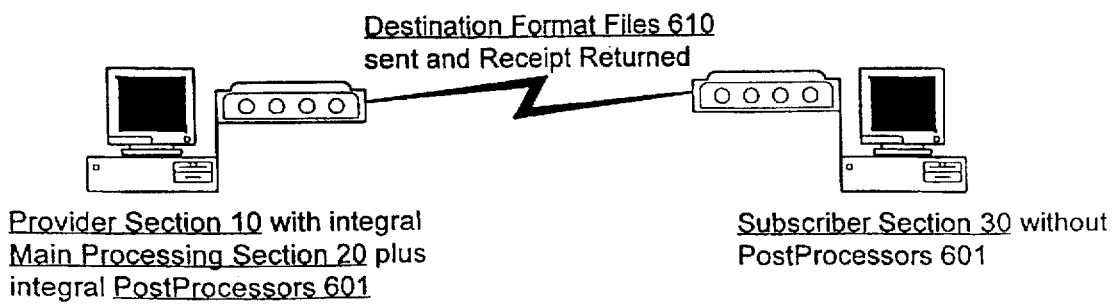

Destination Format Files 610 sent and Receipt Returned

Provider Section 10 with integral Main Processing Section 20 plus integral PostProcessors 601

Subscriber Section 30 without PostProcessors 601

System Architecture Overview

Figure 4: Details of Block 100
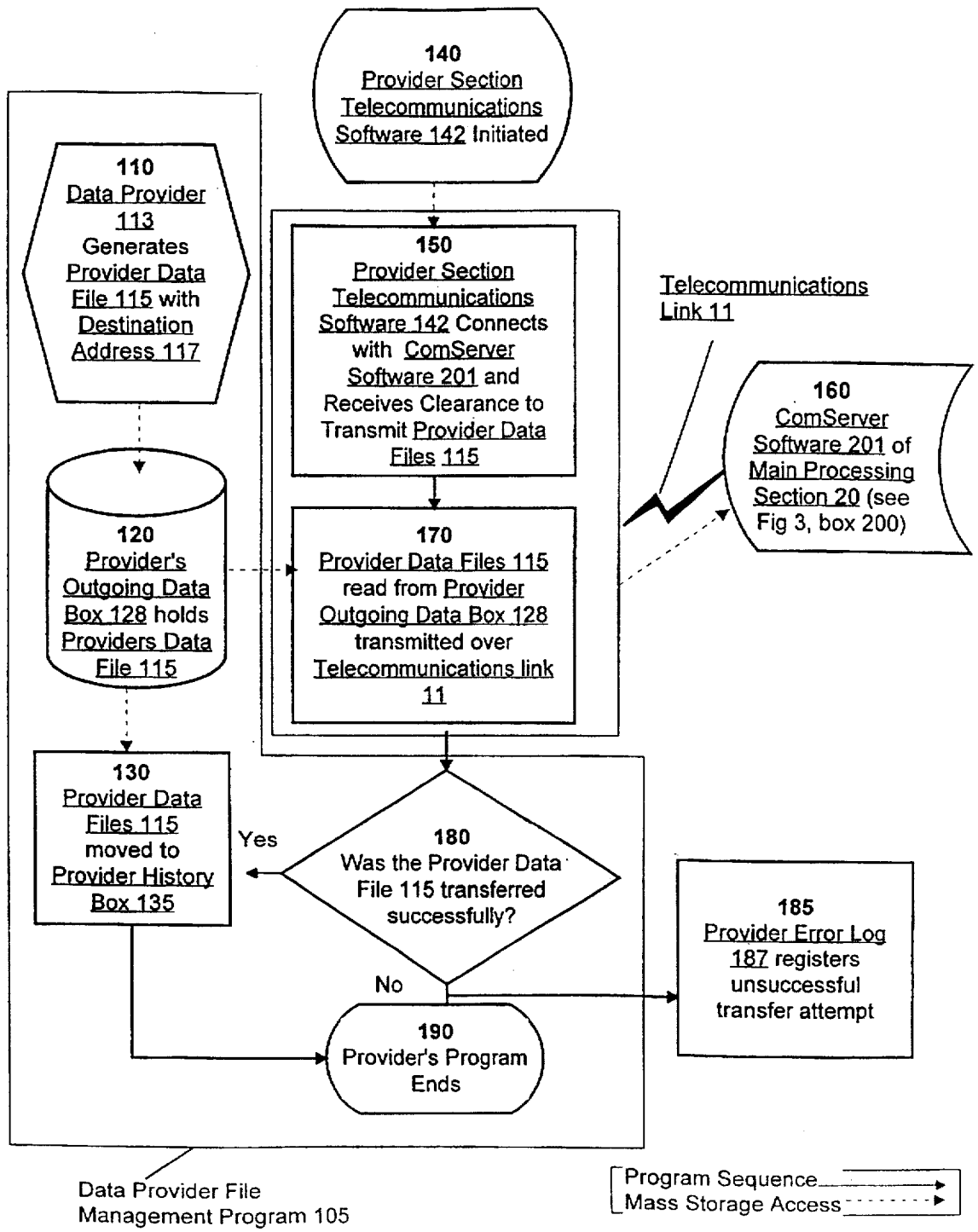

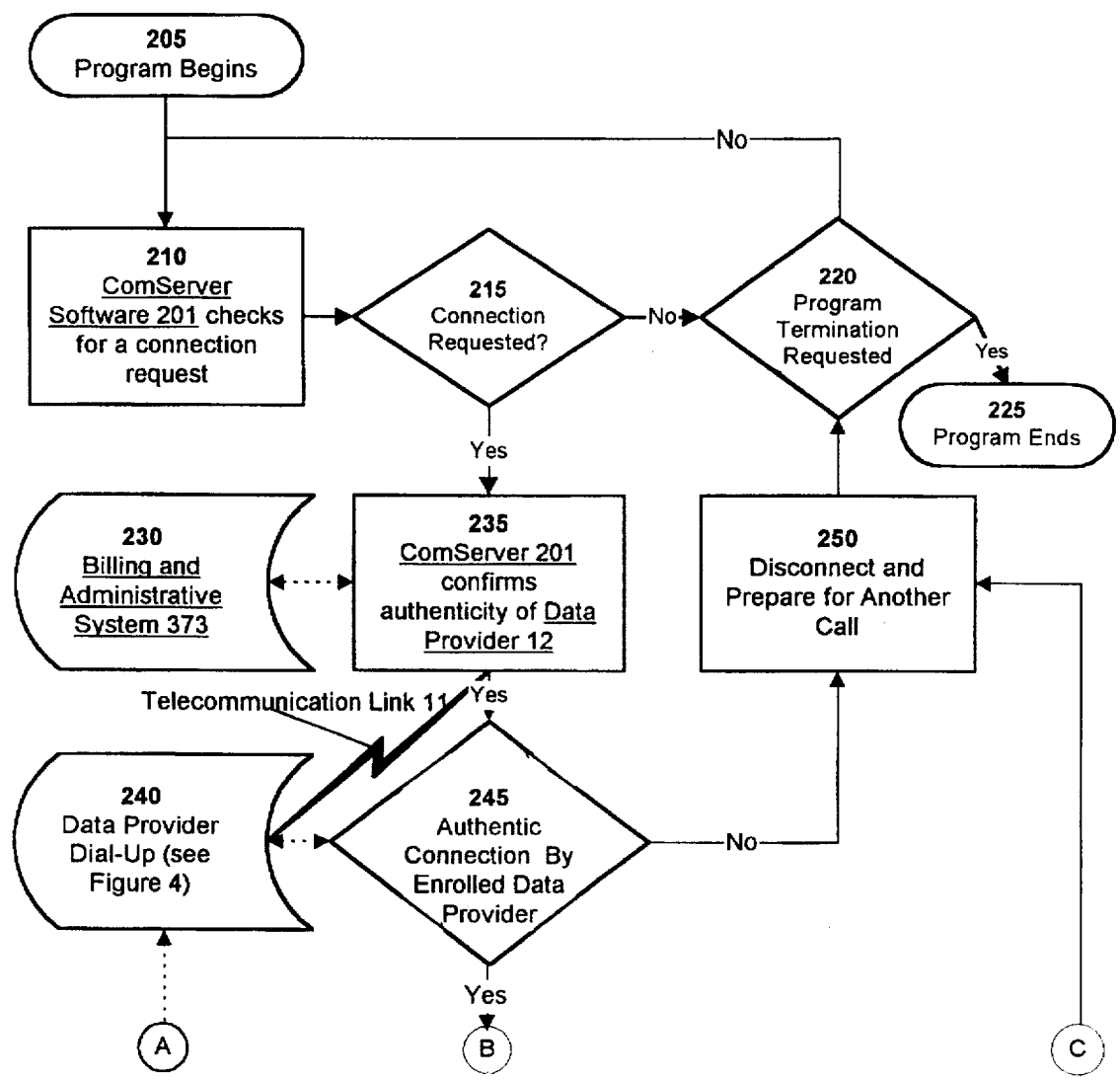
Figure 5: Detail of Block 200

Figure 5: Detail of Block 200
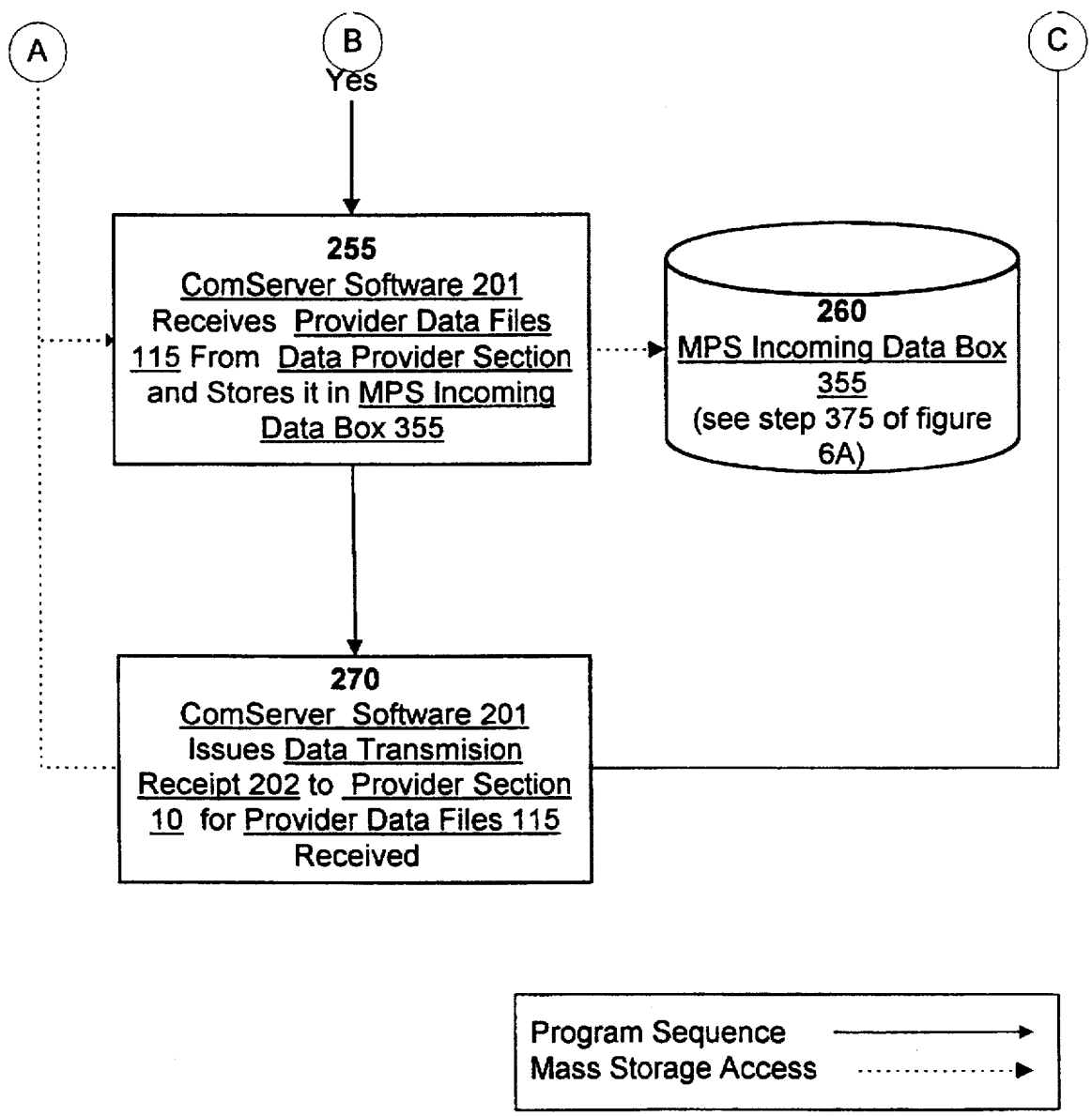

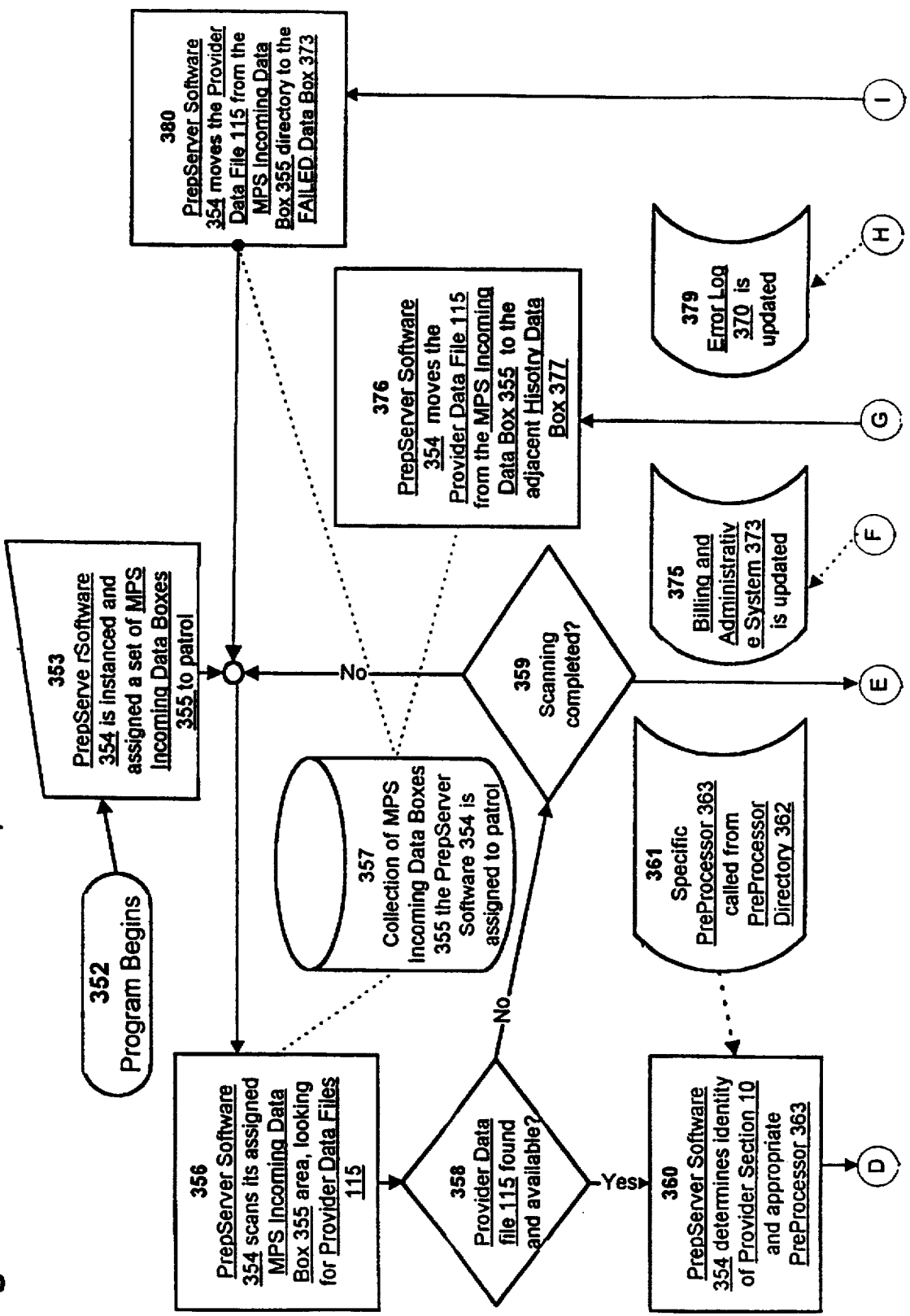
Figure 6A: Detail of Block 300- PrepServer Software Function

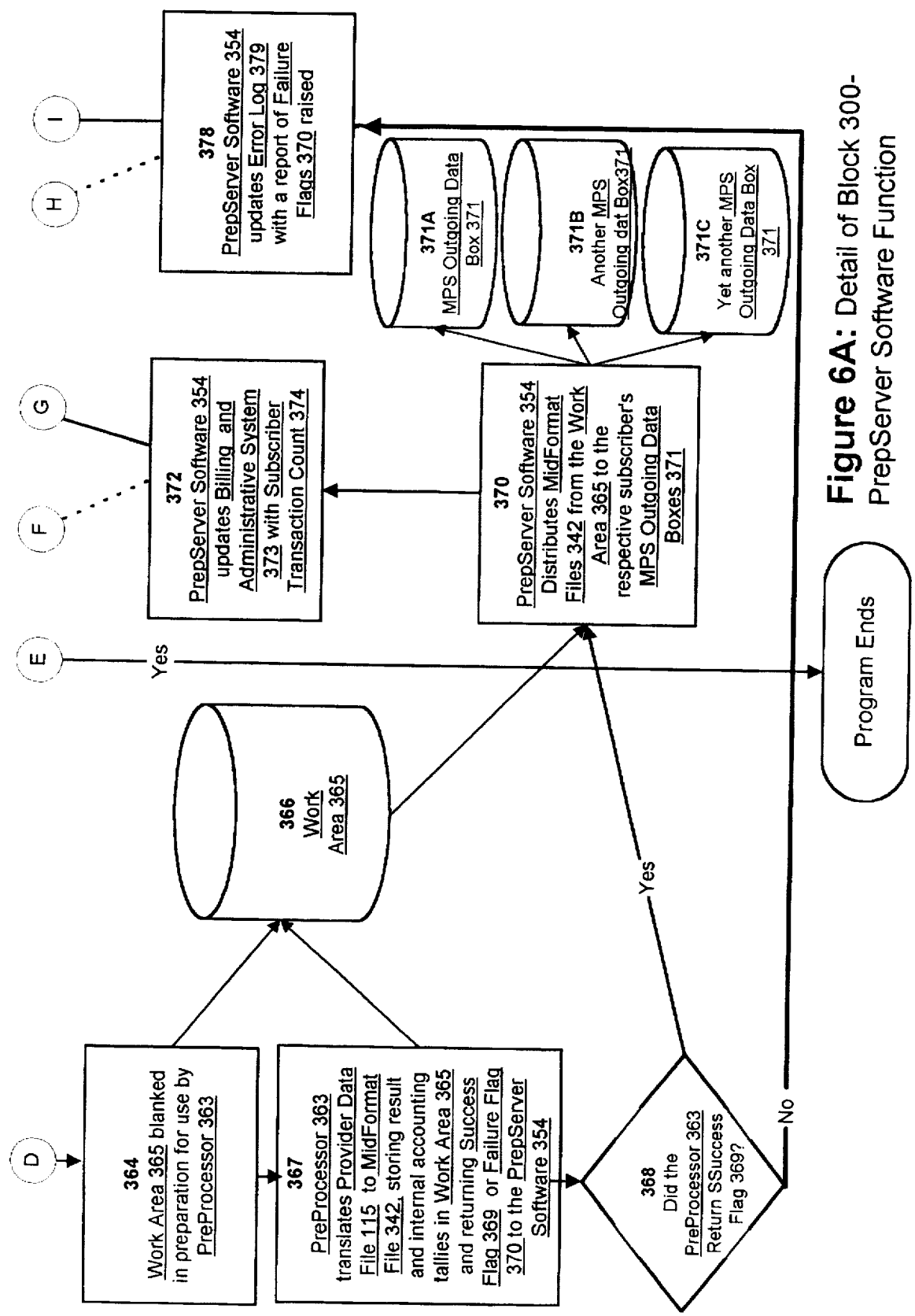
Figure 6A: Detail of Block 300 - PrepServer Software Function

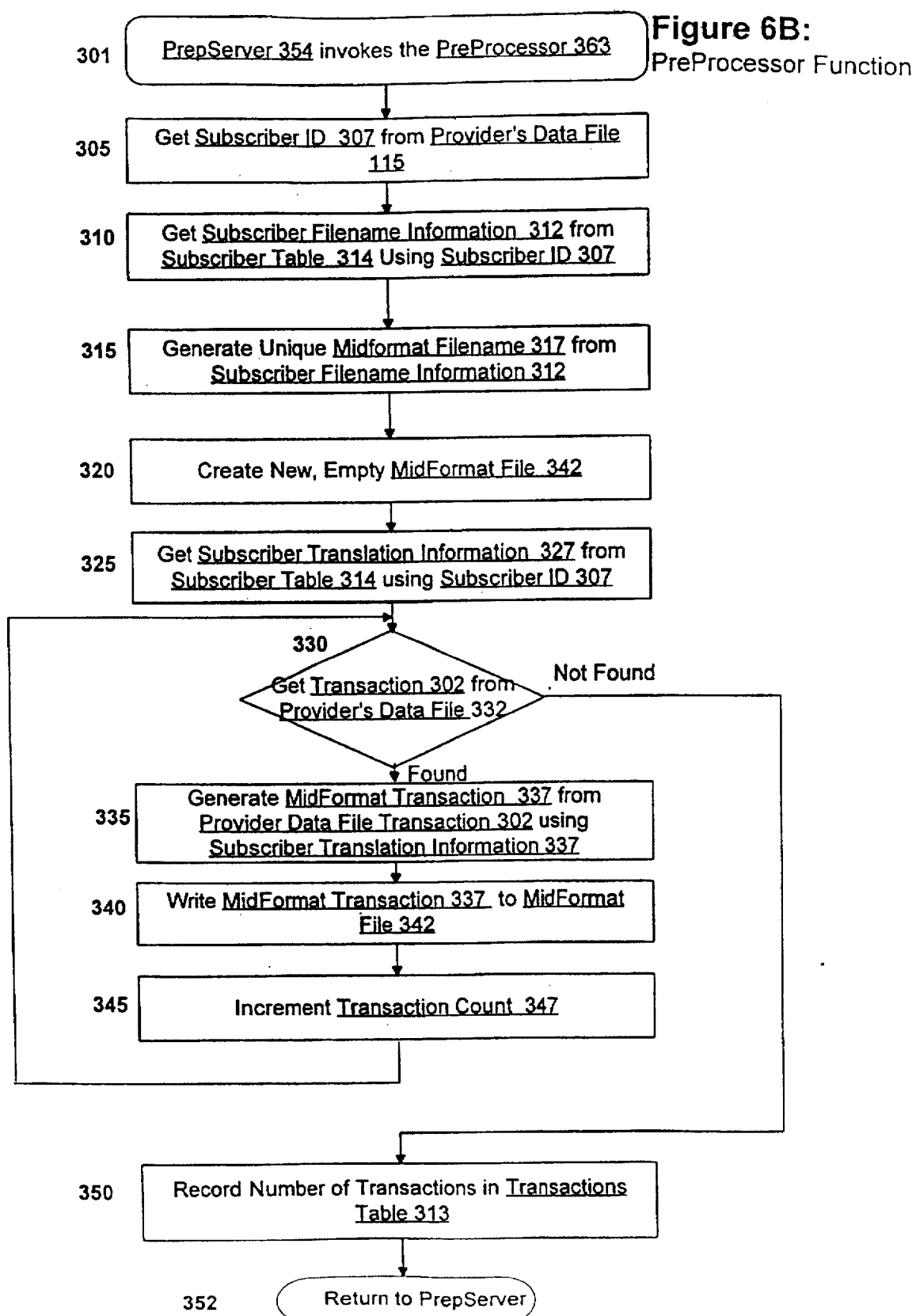
Figure 6B: PreProcessor Function

FIGURE 6C
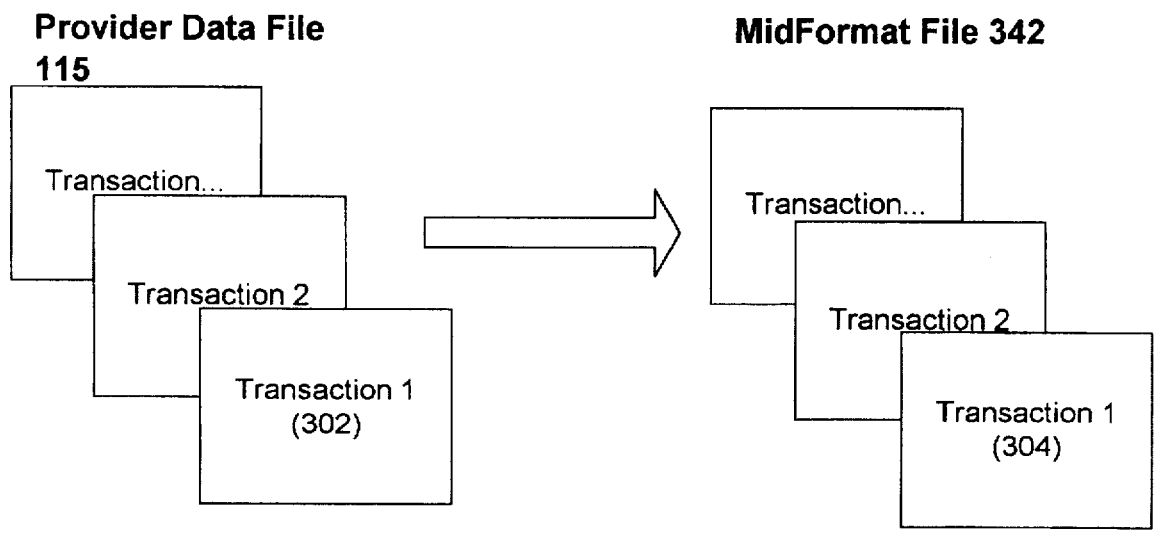
Subscriber Table 314 Examples
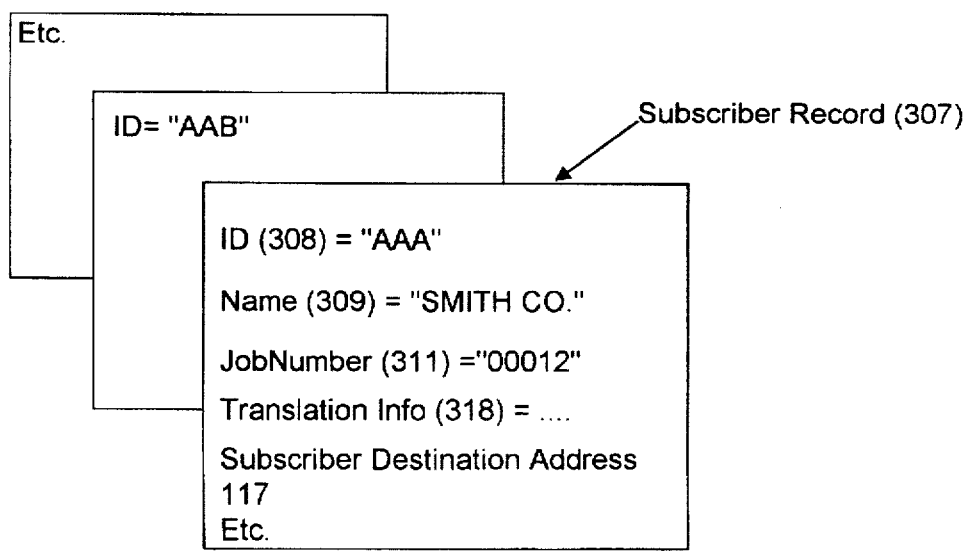

FIGURE 6C, cont'd
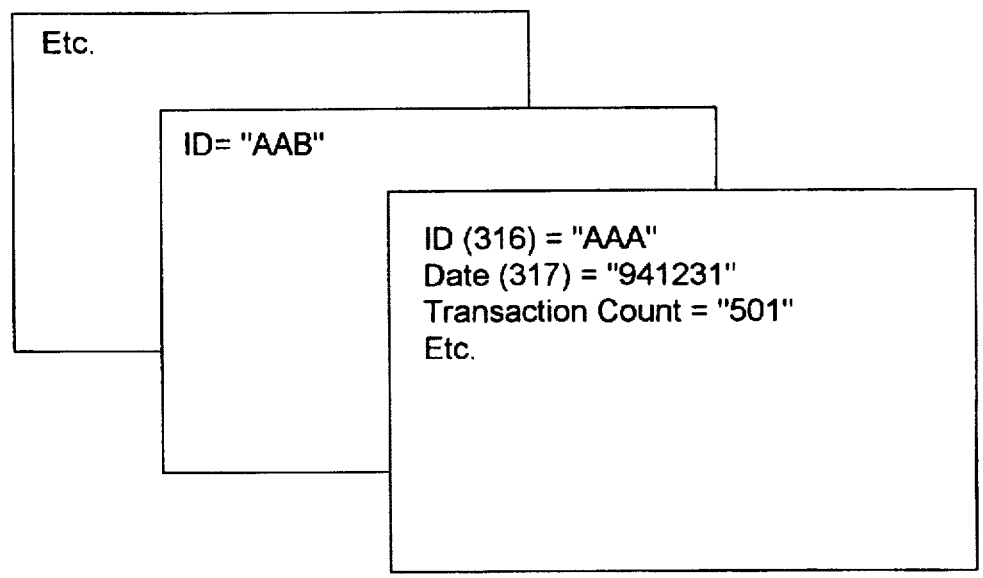

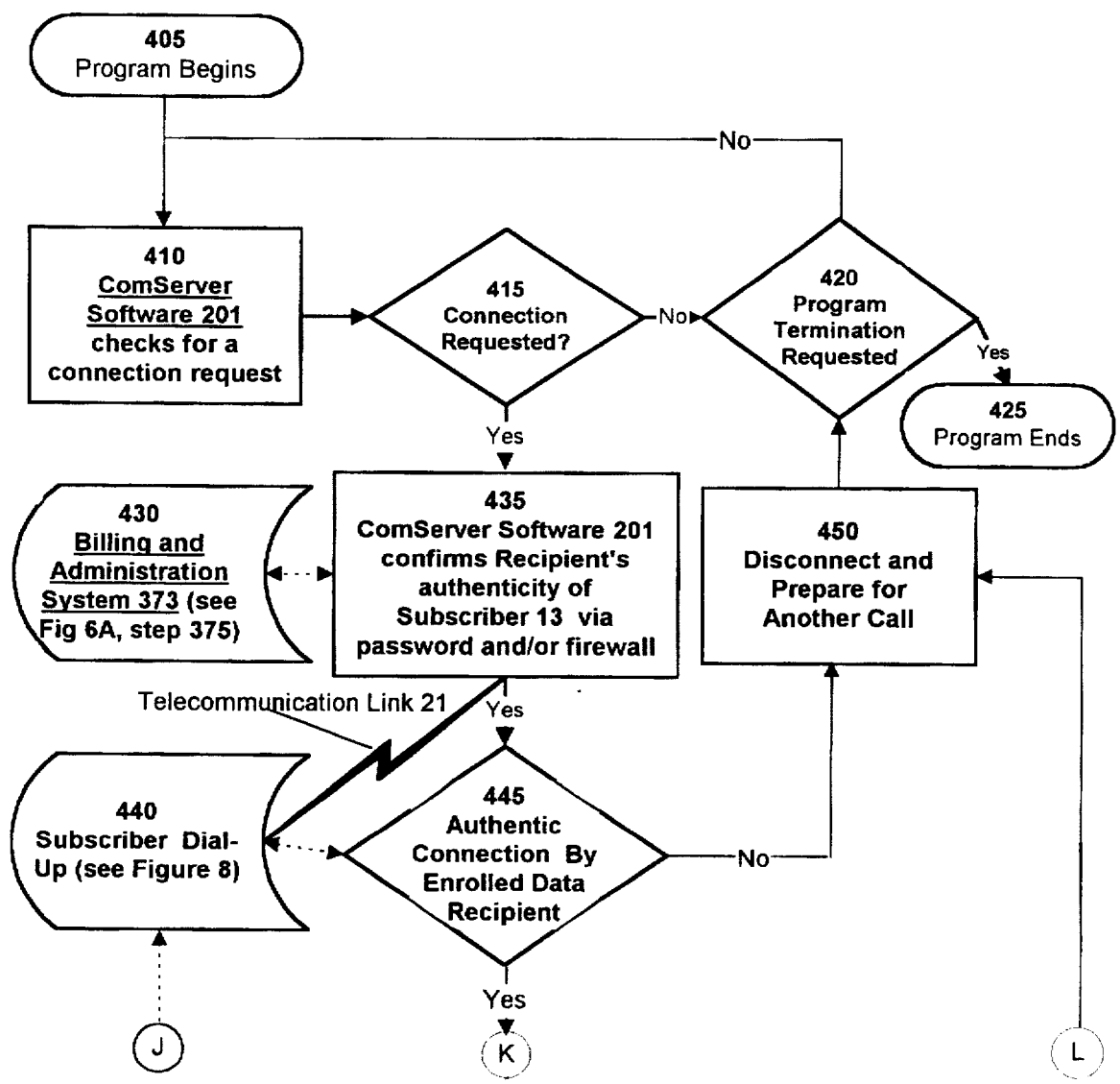
Figure 7: Detail of Block 400

Figure 7: Detail of Block 400
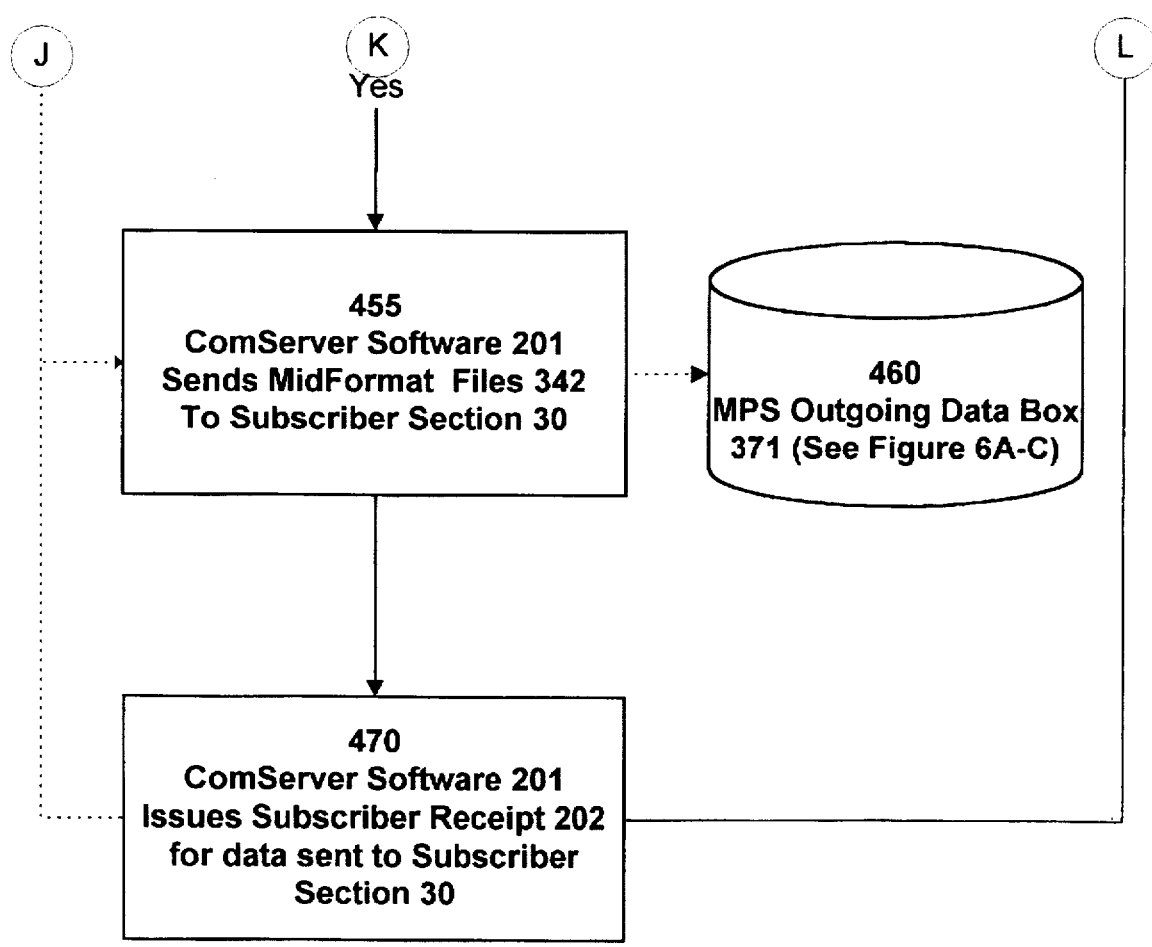

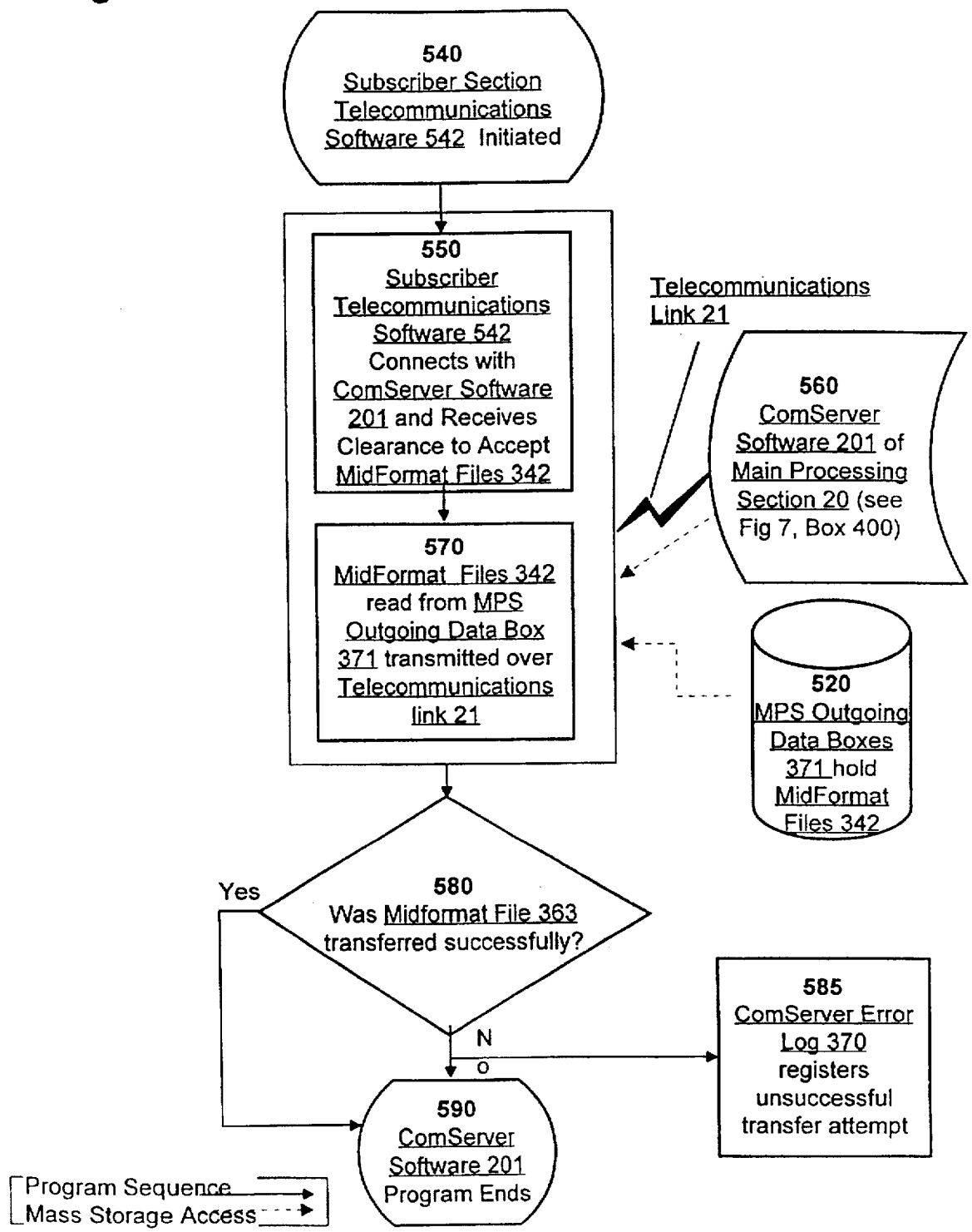
Figure 8: Details of Block 500

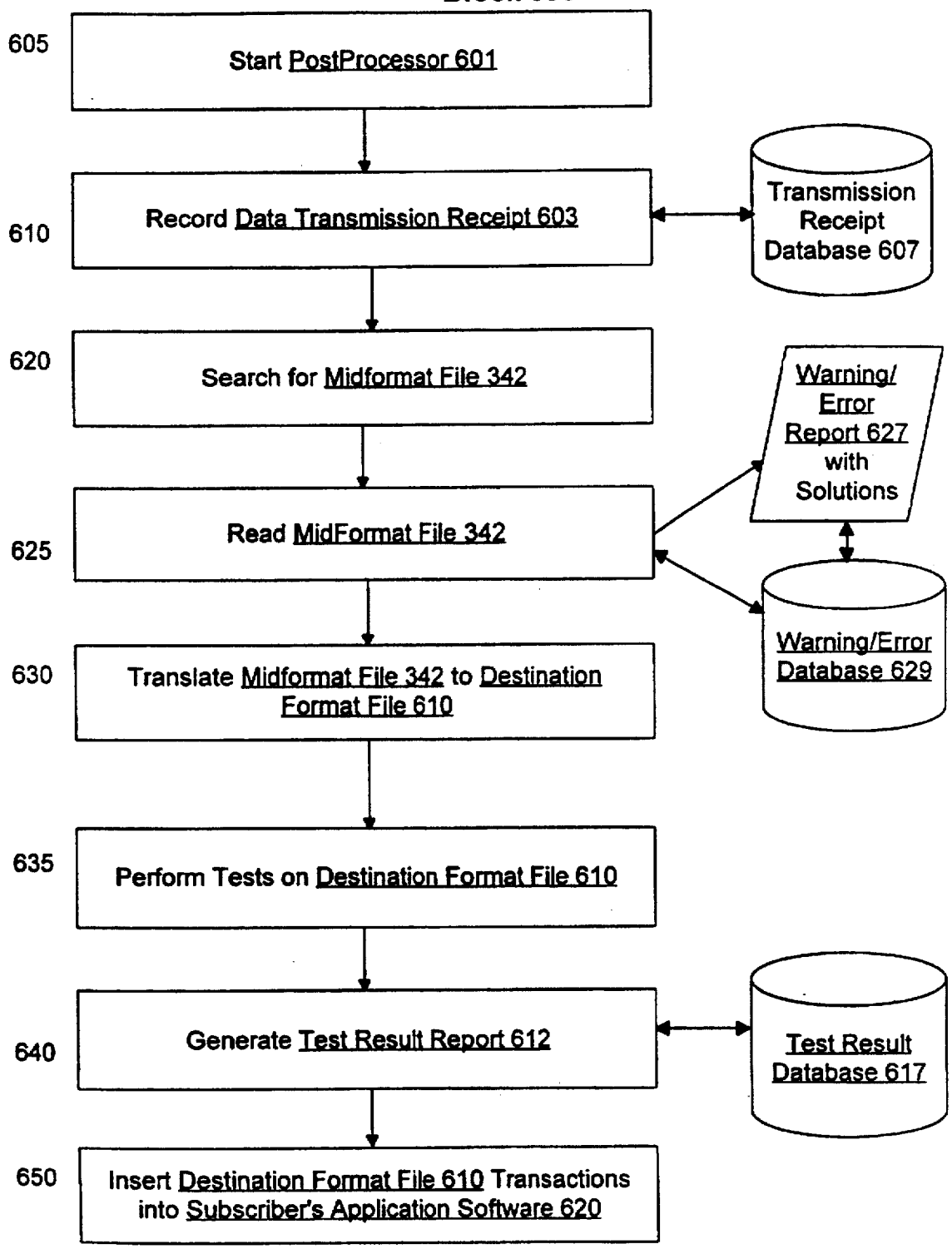

SYSTEM AND METHOD FOR DATA TRANSFER AND PROCESSING HAVING INTELLIGENT SELECTION OF PROCESSING ROUTING AND ADVANCED ROUTING FEATURES

BACKGROUND OF THE INVENTION

1. Field of the Invention

The field of the present invention relates to automated data transfer and translation. The invention provides a method and structure for automatically transferring data, such as accounting data, from a variety of remote sources, in a variety of formats to a plurality of remote sites, where the data is entered into computer applications or storage, the transfer including format translation for compatibility. The invention serves as means to eliminate time-consuming and error-producing manual data re-entry.

2. Background

Computerized data, or electronically stored information, must frequently be moved from one computer to another. In the case of accounting data, for example, banks generally keep computerized records of all of transactions affecting their client's accounts—information which the clients often also wish to keep track of on their own computerized accounting systems. In response to this, a variety of sophisticated computer accounting programs have recently become available to users of small and medium powered computers. However, due to a variety of reasons discussed below, such clients usually have to re-enter data manually from paper printouts obtained from the data provider, for example, from statements from a bank. Manual re-entry of data is not only time-consuming, and hence expensive to undertake in terms of man-hours, but it also is likely to introduce errors into the data set. It has been estimated that manual data re-entry, verification, and validation costs several dollars per transaction.

Methods of automated data transfer are known in the art. The "Intellicharge" system for Quicken (Intuit Inc., Menlo Park, Calif.) downloads credit card transaction information to a Quicken user's computer. The data used, however, comes from a uniform source—a single bank. Hence, Intellicharge does not employ a multiple-format data translation scheme, nor a multiplesource data transmission scheme. Similarly, in the United States Internal Revenue Service "Electronic Filing" program, data is entered and transmitted in a single, specific pre-prescribed format, to a single recipient.

Methods of data translation are also known in the art. A software application entitled "Data Junction" (Tools and Techniques, Inc., Austin, Tex.) translates multiple formats of data. However, the package depends on manual operation to designate the files to be translated, and the formats of the source and destination files. Furthermore, this software does not perform any data transfer, verification, validation, exception reporting, or journal entry correction.

Conventional electronic data exchange (EDI) systems involve two or more companies that have agreed to interact with one another according to a pre-designated standard dictated by the industry in which the transaction is taking place. In order for such a system to work for a given industry, there must be an agreed-upon standard that is used—much like in the case of the IRS system described above. Those industries that do not have such a standard cannot participate. Data analysis, such as exception reporting or statistical analysis, are not features of such systems. Obviously, such systems lack flexibility and versatility.

Additionally, the computer systems that support conventional EDI are expensive to operate and maintain because they are specialized to serve specific industry segments, and hence cannot achieve the efficiency and low cost that economies of scale might permit in a more widely applicable system.

In summary, conventional methods of automated data transfer, and of data translation, are quite limited, due primarily to limited network transfer capabilities, and the lack of universal data format standards. Hence, anyone wishing to automatically transfer data from a variety of computer systems to a variety of others must contend with a plethora of incompatible formats, and a lack of reliable transfer and error detection means. For these reasons, existing data transfer systems have been tailored to work with only one, or very few types of data sources and recipients, and these data translation methods rely heavily on manual intervention. Data transfer technologies and data translation technologies have not, in the prior art, been efficiently integrated.

OBJECTS AND SUMMARY OF THE INVENTION

As can be appreciated from the foregoing discussion, it would be desirable to have a flexible transfer and translation system that would operate on a wide variety of formats, not hampered by the lack of data format standards—a system that takes data in any format, transfers it to a remote location, and inserts it into the software application in which the data is needed. It would be desirable for a system to automatically understand what specific format translations are needed for a specific data recipient, then to be able to automatically carry out such a translation regardless of what format the data was originally in. It would also be desirable for such a system to operate with minimal user interaction, making it faster, cheaper, and more reliable than manual or semiautomatic performance of such tasks. It would also be desirable to enable companies that want to make their computerized data available to outside agencies and individuals to be able to export this data without the time and expense of developing a custom export system. It would also be desirable to have such a system that is modular and scalable on hardware and software levels, so as to provide reliability, serviceability, and adjustability of the system's performance. The present invention fills these aforementioned needs.

The present invention, in one embodiment, comprises a system capable of automatically receiving, at an intermediate processing location, data from a wide variety of remote sources, identifying the format of the data, translating the data to a common format, sending the data to a recipient in an intermediate format, then translating the data to the specific format needed by the particular recipient. A unique system for automatically selecting and implementing specific translation modules may be used. Error checking features ensure that the transferred data matches the original data, and receipts are sent to each section of the system that sends data, and logical, statistical and mathematical operations may be performed on the data. The system utilizes internal databases which allows it to know what format data will arrive in, what format to translate it to, and how many transactions to bill a data-receiving subscriber for. The system performs data translation and transfer, and performs validation, exception reporting, data analysis, and generates and sends receipts. In alternative embodiments, some or all such data processing is performed at one or both of the data source and the data destination, without an intermediate processing location.

BRIEF DESCRIPTION OF THE DRAWINGS

FIGS. 2A, 2B, and 2C illustrate the major aspects of the physical apparatus and spacial layout of some alternative embodiments.

FIG. 4 shows one embodiment of the major components and processes which occur at block 100 of FIG. 3.

FIG. 5 shows one embodiment of the major components and processes which occur at block 200 of FIG. 3.

FIGS. 6A, 6B, and 6C show some embodiments of the major components and processes which occur at block 300 of FIG. 3. FIG. 6A focuses on the role of the PrepServer Software. FIG. 6B focuses on the role of a selected PreProcessor. FIG. 6C illustrates some of the components utilized in FIG. 6B.

FIG. 7 shows one embodiment of the major components and processes which occur at block 400 of FIG. 3.

FIG. 8 shows one embodiment of the major components and processes which occur at block 500 of FIG. 3.

FIG. 9 shows one embodiment of the major components and processes which occur at block 600 of FIG. 3.

BRIEF DESCRIPTION OF THE TABLES

Figure 1:
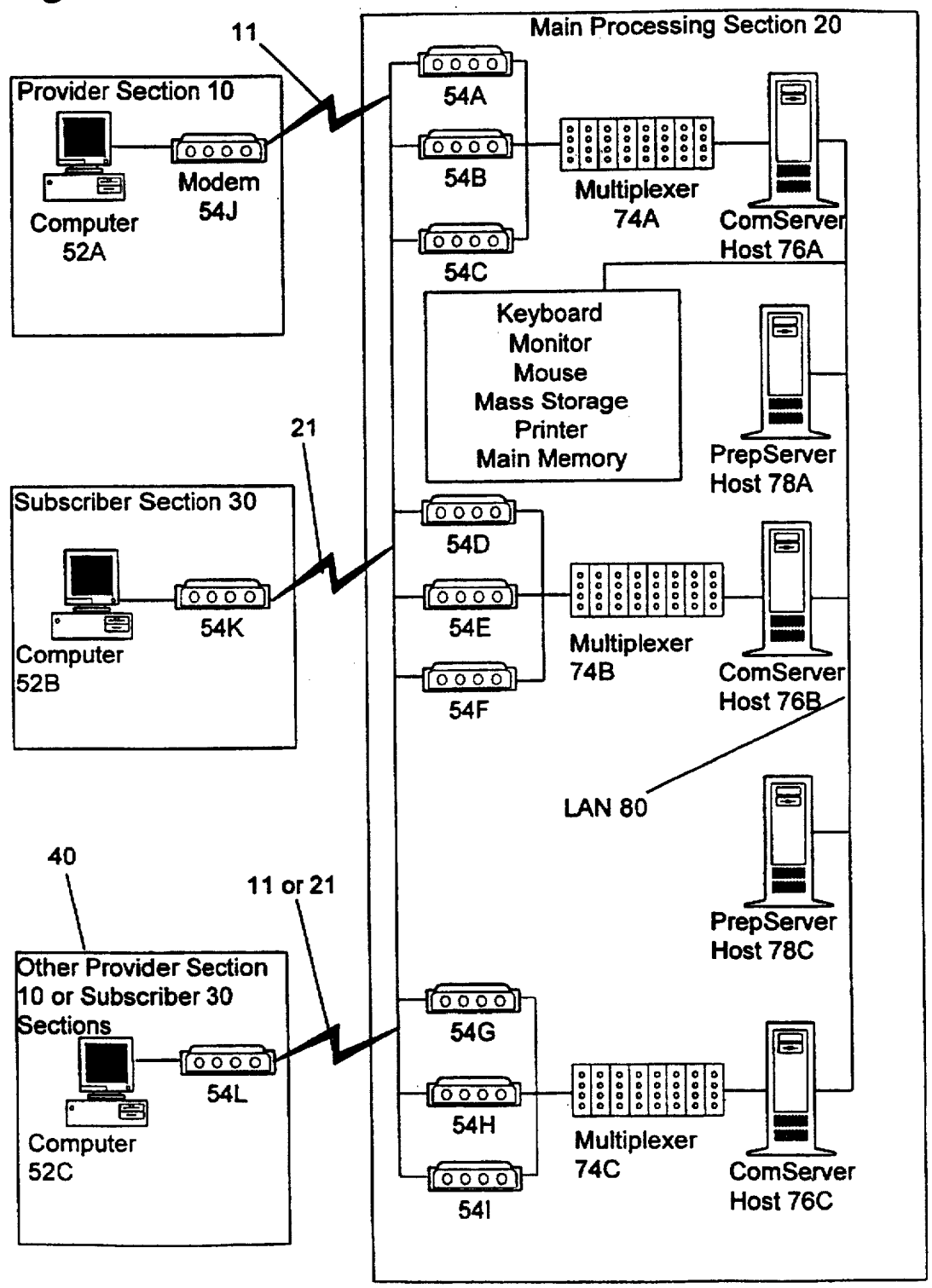
FIG. 1 illustrates the physical apparatus of one embodiment of the invention.

Table 1 shows one embodiment of the Subscriber Database Key to the Master Customer Definition Table.

Table 2 shows one embodiment of the Subscriber Database Key to the Master Mailbox Definition Table.

Table 3 shows one embodiment of the Subscriber Database Key to the Transactions Table for Tracking and Accounting.

Table 4 shows one embodiment of the Subscriber Database Key to the System Log File.

Table 5 shows one embodiment of the Subscriber Database Key to the Incrementing Batch ID Number.

Table 6 shows sample PreProcessor Command-Line Arguments.

Table 7 shows an example of the layout of a payroll file received from a Data Provider.

Table 8 shows an example of the layout of a bank account file received from a Data Provider.

Table 9 shows an example of the layout of a Midformat payroll file.

Table 10 shows an example of the layout of a Midformat bank account file.

Table 11 shows an example of the layout of a Destination Format payroll file.

Table 12 shows an example of the layout of a Destination Format bank account file.

DETAILED DESCRIPTION

A. Definitions and Terminology

ComServer Host

A machine on which the ComServer Software is operating, allowing the machine to control the telecommunication operations of a networked, distributed-task version of the Main Processing Section.

ComServer Software

Telecommunications software, in some embodiments residing on a ComServer Host computer, which receives remotely transmitted data and stores it. It may also transmit processed and unprocessed data to remote sites. Such a system is similar to a computerized mail box system as commonly seen in on-line services such as America Online (Vienna, Va.). ComServer Software functions may be carried out by commercially available software packages such as WildCat! BBS (Mustang Software, Bakersfield, Calif.)

Data Provider File Management Program

A system which enables a user of a Provider Section to connect to the Main Processing Section, and to transmit Provider Data Files, store copies of data files that have been sent, and which stores data transmission receipts.

Data Validation comparison of a data set and a reference data set, including calculated or otherwise derived data, to assess the correctness of the data content of a file. An example is making sure that a specific debit was for a certain amount of money.

Data Verification comparison of a data set with a reference data set or value to assess the completeness of the data set's structure. An example is screening for a checksum error.

Destination Address

Information that tells the system to whom a data file is to be sent, and therefore, it which Outgoing Data Box it is to be placed.

Destination Format

The data format required or requested by the Subscriber. PostProcessors translate MidFormat Files into Destination Format files, and load them into the Subscriber's application software.

Environment Directory

The directory where initialization files, system logs, etc. are kept.

Exception Report

The user report which displays errors or warnings related to transactions that have been processed.

Failed Data Box

A subdirectory used to contain files that were not successfully processed or transmitted at a given location in the system.

Firewall

Security methods which protect a computer system from access, using hardware or software measures. A firewall may be a barrier set up to keep designated Local Area Network (LAN) traffic within an/or without a specific LAN. For example, a firewall can be set up to stop internal e-mail from leaving a LAN, or can be set up to keep outside users from connecting to computers within a LAN.

History Data Box

A subdirectory used to contain files that have been successfully processed or transmitted at a given location in the system.

Mail Box Database

The Main Processing Section database that contains records of Incoming and Outgoing Data Boxes, and to what party they pertain.

Main Processing Section (MPS)

Portions of the invention herein described that are responsible for tasks such as data translation, system usage monitoring, and exception reporting. In one embodiment, the Main Processing Section, including PrepServer Software and/or it's PreProcessors and/or the ComServer Software, and/or Billing and Administrative System resides at a site separate from the sites of the Provider Section and the Subscriber. In one such embodiment, data received from the Provider is processed by the Main Processing Section to provide translated data. This translated data is then sent on to a Subscriber who translates the data again. In alternative embodiments, the Main Processing Section and/or some or all of it's components may reside on either the Provider or Subscriber computers, or split between them, thus eliminating the intermediate site, or reducing the amount of processing that takes place at such an intermediate site.

MPS Incoming Data Box

The subdirectory in which Provider Data Files are placed when it arrives from a specific provider.

MPS Outgoing Data Box

The subscriber-specific subdirectory in which MidFormat Files are placed when PrepServer has successfully processed the file.

MidFormat File

A data file that has been translated into a format common to all data files of that particular type, prior to being converted to a Destination Format. It originates as a translated Provider Data File created by the PreProcessor, and it contains a list of delimited transactions. This file is translated by the PostProcessor into a Destination Format in order to load it into a Subscriber's application software.

Number of Transactions

A tally internal to each PreProcessor which counts the number of transactions that are processed.

PostProcessor

A program which translates a MidFormat File into the specific Destination Format required by a Subscriber, and loads the Destination Format data into Subscriber's Application Software.

PreProcessors

Software programs controlled by the PrepServer Software, which automatically perform data format translations for specific Data Providers. These programs translate Provider Data Files into MidFormat Files, and record the number of transactions processed into a Transactions Table.

PrepServer Host

A machine in which PrepServer Software is the principal software, allowing the machine to specialize in the PrepServer Software tasks of a networked, distributed version of the Main Processing Section.

PrepServer Software

Software, in some embodiments residing on a PrepServer Host computer, which takes unprocessed data from the ComServer Software by scanning Incoming Data Boxes for received Provider Data Files. If found, the PrepServer Software processes the data with a specific set of instructions (for example, by selecting the appropriate PreProcessor), and places the data in a specific MPS Outgoing Data Box mapped to the data's ultimate destination.

Provider

A Data Provider. A company which sends transaction data to the Main Processing Section. An example is a bank which electronically transfers account statements. Another example is a laboratory which electronically transfers the results of it's blood sample analysis.

Provider Data File

A file uploaded into a mailbox by a Provider containing a list of transactions in the Provider's data format. This file will be translated by the PreProcessor into a MidFormat File. Also known as a Raw Transactions File (RTF).

Provider History Box

The subdirectory in which a Provider Section retains a copy of files that have been successfully transferred to the Main Processing Section.

Provider Outgoing Data Box

The subdirectory in which a Provider Section places Provider Data Files that are ready for transmission.

Provider Section

That hardware and software portion of the system herein described which reside at physical location of the Data Provider, usually including telecommunications software and Provider Data Files to be transferred.

Raw Transactions File (RTF)

See Provider Data File

Subscriber

Also known as Data Subscriber. The end-recipient of the data in the herein described system. A Subscriber has Subscriber's Application Software (such as a financial software package) which can make use only of data files that are in certain formats. The subscriber wishes to have data residing at a the Provider Section to be sent to him, and to be translated in a format that is suitable for use by his application software.

Subscriber's Application Software a computer application program, such as accounting packages like Platinum (Platinum Software, Irvine, Calif.) into which a Subscriber wishes to enter data. Subscriber's Application software typically requires data to be in a specific format before it can be accepted.

Subscriber ID

The unique identification key assigned to each subscriber.

Subscriber Incoming Data Box

The Subscriber Section subdirectory in which MidFormat files transmitted from the Main Processing Section first arrive, and where they can be found by the PostProcessor.

Subscriber Section

Those hardware and software portions of the system herein described that reside at the physical location of the Data Subscriber, usually including a PostProcessor program.

Subscriber Table

A database file containing subscriber information such as Subscriber ID number, Subscriber Name, Job Number, Translation Information, Subscriber Destination Address, and subscriber Filename Information.

Syslog

A file, such as one in the environment directory, used to record system activity.

Table

Depending upon the context, this term may refer to a display of information used as an exhibit for this patent application, or may be used to mean a database file.

Test Result Report

A report for the user of a subscriber Section displaying errors and warnings related to user specific transactions. Statistical and Boolean logic data validation methods may constitute the basis of the report.

Test Result Database

A Database storing the validation, statistical, and Boolean calculations and algorithms necessary to produce a Test Result Report.

Transaction

Data representing a specific activity, entity, or portion thereof. Examples include financial transactions such as: a check item debit in a bank statement, a credit debit in a VISA statement, or a shipping charge in a Federal Express bill, and non-financial transactions such as laboratory test results sent from a laboratory to a hospital.

Transaction Type

A unique type of transaction, e.g. a line-item in a customer bill.

Transmission Receipt

An electronic document which serves to notify a user as to whether a data transmission has been successfully or unsuccessfully transmitted.

Transmission Receipt Database

A database storing all Transmission Receipts received.

Transactions Table

The database file containing a list of processed transactions for all Subscribers.

User a person who is operating a specified section of the system herein described, at a given time.

Work Directory

A temporary directory created by the PrepServer Software and used by the PreProcessor as work space in which to carry out data translation and manipulation processes.

B. Description of Exemplary Embodiments

In the foregoing definitions, it should be appreciated that the system herein described is composed of subsystems which perform their tasks simultaneously, or in a rapidly alternating, interactive fashion. Because a written specification requires putting these parallel processes into a linear explanation, discussions of such processes are presented here in a manner that requires moving back and forth between figures, system components, events, and stages within the processes.

In one embodiment, shown in the block diagram of FIG. 1, the system of the present invention extends over three or more sites—that of one or more Provider Sections 10, that of Main Processing Section 20, and that of one or more Subscriber Sections 30. These sites are linked, for example, by telecommunication methods such as modems (depicted as Telecommunications Links 11 and 21).

At Provider Section 10, Computer 52A may be one such as an IBM-compatible PC with a CPU such as Pentium Chip (Intel Inc., Santa Clara, Calif.), Main Memory such as Random Access Memory in quantities such as 8 Megabytes, and with peripheral devices such as a Monitor (NEC, Woodale, Ill.), a Mouse (Microsoft Corp., Redmond, Wash.), a Keyboard (Microsoft Corp., Redmond, Wash.), Mass Storage such as a hard drive (Maxtor, San Jose, Calif.) or other mass storage. Telecommunication Means such as Modem 54J, such as the Sportster 14.4 (U.S. Robotics, Skokie, Ill.) may be used. The modem requires the use of telecommunications software such as that provided RipTerm and Rip Paint (Telegraphics, Huntington Beach, Calif.). The computer may use an operating system such as MS-DOS 6.0 (Microsoft Corp., Redmond, Washington). A Printer such as one by Hewlett-Packard (Boise, Id.) may also be attached.

Hardware and software components in the telecommunication-linked system herein described can be relocated to various physical locations and still perform their respective functions, as will be shown in the discussion of FIG. 2A-2C. With the exception of the FIGS. 2A-2C discussion, however, for the purposes of further discussion in this document, an embodiment of the Provider Section 10 will be considered to include Provider Section Telecommunications Software, a Data Provider File Management Program, Provider data Files, and hardware such as that previously described.

In one embodiment, at Main Processing Section 20, there are preferably two or more computers joined together in a network, using standard hardware such as an Ethernet card (Western Digital, Irvine, Calif.), and software such as Netware 3.1 by Novell Inc., (Provo Utah). A first computer, ComServer Host 76A, operates under the control of ComServer Software, described later, allowing it to specialize in communications via links 11 and 21, with other computers, such as Provider Section 10, PrepServer Host 78A, and Subscriber Section 30. A second computer, PrepServer Host 78A operates under the control of PrepServer Software, later described, which enables PrepServer Host 78A to specialize in data processing. ComServer Host 76A, and PrepServer Host 78A may each have the same hardware and operating system as the computer above described at Provider Section 10, except, of course, that ComServer Host 76A, and PrepServer Host 78A will also run the specialized software programs collectively referred to as ComServer Software and PrepServer Software. As an addition exception, only ComServer Host 76A requires a modem if both PrepServer Host 78A and ComServer Host 76A are used together. Multiple Modems 54A connected to the network via Multiplexer 74B such as the Wildcat! BBS IM, MultiPort multiplexer (Mustang Software, Bakersfield, Calif.) may be used in order to improve the efficiency of remote data reception and transmission from multiple parties simultaneously.

Hardware and software components in the telecommunication-linked system herein described can be relocated to various physical locations and still perform their respective functions as will be shown in the discussion of figure 2A–2C. With the exception of the FIG. 2A–2C discussion, however, for the purposes of further discussion in this document, an embodiment of the Main Processing Section 20 will be considered to include ComServer Software, PrepServer Software, PreProcessors, Billing and Administrative System, and hardware such as that previously described.

At Subscriber Section 30, the computer hardware and software may be exactly the same as that described for Provider Section 10. Additionally, the User of Subscriber Section 30 will have application software which requires input data files to be in a certain formats—hence giving the User of Subscriber Section 30 the need for using the system herein described. Examples of such Subscriber's Application Software include the accounting package called Platinum (Platinum Software, Irvine Calif.), spreadsheets such as Excel (Microsoft Corp., Redmond Wash.), and databases such as dbase (Borland, Scotts Valley, Calif.).

Hardware and software components in the telecommunication-linked system herein described can be relocated to various physical locations and still perform their respective functions as will be shown in the discussion of FIG. 2A–2C. With the exception of the FIG. 2A–2C discussion, however, for the purposes of further discussion in this document, an embodiment of the Subscriber Section 30 will be considered to include Subscriber Telecommunication Software, MidFormat Files, at least one PostProcessor, Subscriber's Application Software, and hardware such as that previously described.

A set of data that a Provider Section 10 sends to Main Processing Section 20 is called Provider Data File 115. The content of Provider Data File 115 may be accounting and financial information including but not limited to payroll transactions, bank transactions, bills, and cash receipts. The data may also be any of a wide variety of non-financial types, such as the values that a laboratory has found for specific attributes of a patient's blood sample, such as hemoglobin, hematocrit, sodium, potassium, and chloride levels. The format of these data can be divided into general categories, including, but not limited to ASCII, ANSI X.12, EDIFACT, Binary Files with Headers, graphics files, sound files, video files, and alternate compression method files. Such general categories may be further subdivided into an array of different formats. ASCII, or EBCDIC files, for example, may appear in several formats including, but not limited to Carriage return, Line Feed, Fixed Width without Carriage Return, and delimited files. The particular format of a Provider Data File 115 is generically referred to herein as the Provider's Data Format. Regardless of the format used, a Destination Address 117, which describes who the data is for, accompanies the actual data within Provider Data File 115.

In a typical pattern of information flow, a Provider Data File originating on Computer 52A of Provider Section 10 is sent via Modem 54J and Telecommunications Link 11 to Main Processing Section 20 via an array of one or more Modems 54A through 54I and Multiplexers 74 coordinated by one or more ComServer Hosts 76A, 76B, 76C. After the data file is processed in an associated one of PrepServer Host 78A, 78B, 78C, the data, now in the form of a MidFormat File, is sent via one or more ComServer 76A, 76B, 76C, and the multiplexed array of one or more Modem 54A through 54I, through Telecommunication link 21 to Subscriber Section 30, where the data is further translated, if necessary, and utilized within a computer application. Box 40 represents the numerous other Provider Sections and Subscriber Sections with which the system may simultaneously or sequentially interact.

FIGS. 2A, 2B, and 2C illustrate alternative configurations for the physical location of the system's components, in which there are two rather than three sites through which data must pass. Specifically, Main Processing Section 20 does not have a separate physical location, and instead resides in Provider Section 10 only, or Subscriber Section 30 only. Main Processing Section 20 may also be parceled between Provider Section 10 and Subscriber Section 30. Furthermore, other components such as Subscriber Section 30 may be parceled. As long as the components are somewhere on the system, all necessary tasks can be accomplished in accordance with this invention. Thus, a given data file may be transmitted directly from Provider Section 10 to Subscriber Section 30, with the appropriate translation being provided.

In FIG. 2A, Provider Section 10 uses Main Processing Section software on it's own computer data storage device such that it can send MidFormat Files to Subscriber Section 30, which can subsequently use PostProcessors to bring the data into the required format for loading it into the Subscriber's Application Software.

In FIG. 2B, Subscriber Section 30 has Main Processing Section 20 within it, in addition to it's usual components. With the system configured in this manner, Subscriber Section 30 can receive files in their native Provider's Data Format, and perform all necessary processing, including translation, on site.

In FIG. 2C, Provider Section 10 has incorporated not only the components of Main Processing Section 20, but also PostProcessors. In this configuration, Provider Section 10 can send Destination Format files to Subscriber Section 30, ready to be used by the Subscriber's Application Software.

Of course, there are a wide variety of intermediate variations possible in which various components of the invention, such as PrepServer Software, PreProcessor, and PostProcessor, reside on the different machines through which information passes. It can be appreciated that cooperative behavior of the multiple computers interacting under the directions of the invention's software makes the physical location of any given component unimportant to the overall process.

When the system is implemented without a separate location for Main Processing Section 20, a separate Communications Server Host 76 computer may not desirable, since a smaller volume of transmissions will likely pass through Main Processing Section 20, increasing the feasibility of more simple telecommunications setups.

Figure 3:
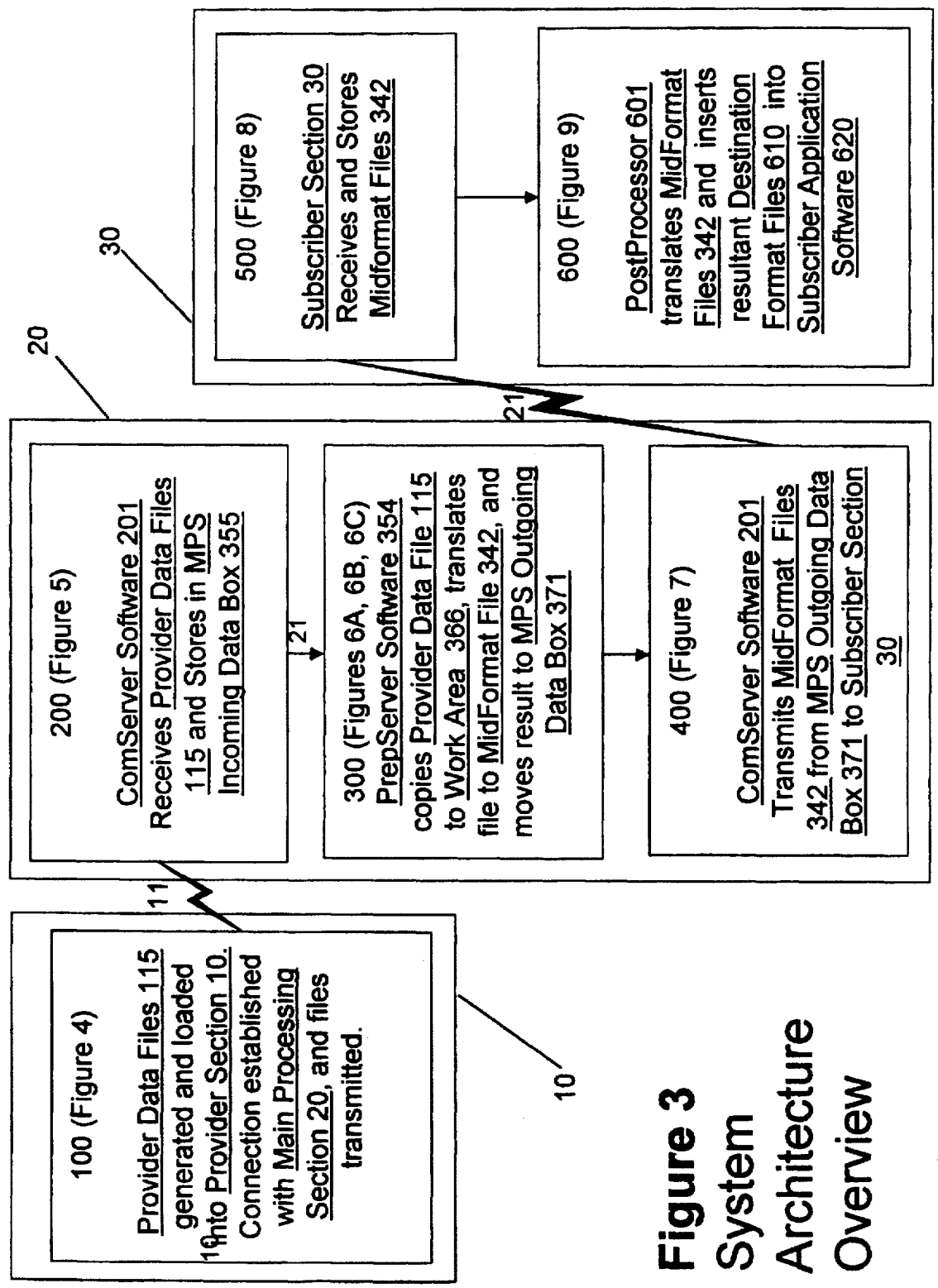
FIG. 3 shows an overview of an embodiment of the system architecture from the standpoint of process. Each block within this figure corresponds with one or more detailed separate figures.

FIG. 3 shows an overview of one embodiment, demonstrating the main features of the system architecture at a process level, each block corresponding to one or more detailed Figures on successive sheets of the drawings. In Block 100 activities occurring at Provider Section 10 are highlighted, and is detailed in FIG. 4. Blocks 200, 300, and 400 highlight activities occurring at Main Processing Section 20, and are further detailed in FIGS. 5, 6A–C, and 7, respectively. Blocks 500 and 600 highlight activities occurring at subscriber Section 30, and are further detailed in FIG. 8 and 9, respectively.

In Block 100, Provider Data Files 115 generated by Data Provider 113, and residing on Provider Section 10 are transmitted to Main Processing Section 20 via Telecommunications Link 11.

In Block 200, Provider Data Files 115 received via Telecommunication Link 11 and ComServer Software 201 is stored in MPS Incoming Data Box 355.

In Block 300, PrepServer Software 354 copies Provider Data File 115 from MPS incoming Data Box 355, to Work Area 366. Subsequently, the file is format-translated from the native format of Provider Data File 115, to that of a MidFormat File 342. This resultant MidFormat File 342 is then moved to MPS Outgoing Data Box 371.

In Block 400, ComServer Software 201 at Main Processing Section 20 forms Telecommunications Link 21 with the telecommunications software of Subscriber Section 30. MidFormat Files 342 that are in MPS Outgoing Data Box 371 which correspond to the particular Subscriber Section 30 with which contact is made, are transmitted over Telecommunications Link 21, to Subscriber Section 30.

In Block 500, Subscriber Section 30 receives MidFormat Files 342 from Main Processing Section 20, and stores these files.

In Block 600, PostProcessor 60 translates MidFormat Files 342 into Destination Format Files 610—the format needed by Subscriber Application Software 620. Destination Format Files are then inserted into Subscriber Application Software 620.

FIG. 4 shows in more detail one embodiment of events occurring within Block 200 of FIG. 3. Steps 110, 120, 130, 180, and 190 collectively form Data Provider File Management Program 105. Data Provider File Management Program 105 works in conjunction with Provider Section Telecommunication Software 142. Of course, these programs typically run concurrently with Main Processing Section telecommunications software while data is being downloaded—a process shown in detail in FIG. 5.

In step 110, Provider Data Files 115 are generated by Data Provider 113 by means well known in the art. One simple example of this is a Data Provider 113 manually entering data pertaining to a specific Data Subscriber into a database application such as dbase (Borland, Scotts Valley, Calif.). Adding a Destination Address 117 to such a data file is performed by a variety of means, including simply typing in an alphanumeric string into a designated field of the file, the string being uniquely representative of the specific Subscriber that the data is intended to ultimately reach. An example of this is a bank that enters the social security number of a client into a certain field of their file of cleared bank checks. In step 120, Provider Data File 115 with Destination Address 117 is loaded into Provider Section 10 computer, into Outgoing Data Box 128. Here, this particular process halts, and does not proceed to step 130, until prompted by Provider Section Telecommunications Software 142. Provider Section Telecommunications Software 142 is initiated in step 140 by any of a variety of methods, including being set to initiate at a specific time, and initiating when a call is received from ComServer Software 201 of Main Processing Section 20. These methods are discussed in detail in the discussion of FIG. 5, steps 235 and 245. The basic problem that all of these methods address is that the quality of data ultimately delivered to Data Subscribers 33 must be ensured. Not having safeguards would be to risk obtaining an incorrect or error-ridden data set either accidentally or by the intent of some third party posing as a provider. Similarly, a party other than the correct Subscriber Section 30 must not be allowed to receive proprietary and potentially sensitive data files belonging to another. Hence, caller validation procedures, coordinated, for example, by Main Processing Section 20, become important.

In one embodiment, the data transmission process is invoked in step 140, where the uploading process is initiated via Telecommunications Software 142. In step 150, Provider 113 connects with ComServer 152 and upon being validated by the methods discussed in the description of FIG. 5, receives clearance to transmit a copy of Provider Data File 115 to Main Processing Section 20. At this point Provider Data Files 115 that had been placed in Provider's Outgoing Data Box 128 in step 120 are read in step 170, copies being transmitted in step 160 over Telecommunications Link 11, to Main Processing Section 20. In step 180, Telecommunications Software 142 determines whether a copy of Provider Data File 115 has been transmitted successfully. Successful data transmission is signaled to Main Processing Section 20 by a response produced by the modem protocol. Most standard modem protocols including X, Y, and Z modem protocols have internal error checking means to carry out such a signaling process. If Provider Data File 115 has been successfully transmitted, then the Provider Data File 115 duplicate remaining in Outgoing Data Box 128 is "moved" to History Data Box 135 in step 130, for example by simply renaming the subdirectory. If Provider Data File 115 is not successfully transmitted, then an error appears in Provider Error Log 187, in step 185. Data Provider File Management Program 105 is thus completed.

Using a modem, Provider Section 10 can either directly transmit Provider Data Files 115 to Main Processing Section 20, or electronically mail this information. Of course, there are many other means of electronic data transmission known in the art that are also suitable for this purpose, within the framework of the present invention. Any of a variety of modem protocols may be used, such as X, Y, or Z modem protocols.

Alternative methods of communication and electronic mail between separately located sections of this system include the use of on-line services such as CompuServe, America Online, Prodigy, or infrastructures such as the Internet, or the Information Superhighway, each with their respective electronic mail and file transfer capabilities.

In another alternative embodiment, non-modem transmission means such as ISDN, and Internet IP/FTP transmit the data from Provider Section 10 to Main Processing Section 20.

The information transmitted by Provider Section 10 can be encrypted with a combination of security techniques, including, but not limited to data encryption and security measures. Methods of data encryption are well known in the art. Examples of data encryption methods are RSA Data Security (Redwood City, Calif.) software solutions, and the use of the proposed "Clipper" chip hardware solution.

Data Provider Telecommunications Software 142 used to support the telecommunication links necessary to transfer Midformat Files 342 from Provider Section 10 to Main Processing Section 20 may be one such as RipTerm (TeleGrafix Communications Inc., Huntington Beach, Calif.). A simple user interface that gives the necessary instructions to the telecommunications software to carry out the previously tasks may be assembled by well-known methods using software such as RipPaint (TeleGrafix Communications Inc., Huntington Beach, Calif.).

FIG. 5 details an embodiment of Block 200 of FIG. 3, in which ComServer Software 201 at Main Processing Section 20 receives Provider Data files 115, and stores them in a specific MPS Incoming Data Box 355.

In step 205, ComServer Software 201 is started by the user of Main Processing Section 20.

In step 210, ComServer Software 201 continuously scans modems 54 and multiplexers 74 for a Provider 12. In an alternative embodiment, ComServer Software 201 scans modems 54 and multiplexers 74 for a Provider 12 at predetermined time intervals. In another alternative embodiment, ComServer Software 201 scans modems 54 and multiplexers 74 for a Provider 12 at the command of a Main Processing Section 20 user.

In Step 215, ComServer Software 201 determines whether a Provider Section 10 is calling Main Processing Section 20, requesting a connection.

In Step 220, ComServer Software 201 determines that a call is not made, or that program termination has been otherwise requested.

In Step 225, ComServer Software 201 is terminated, as it has been instructed by the program's flow. In an alternative embodiment, ComServer Software 201 is terminated on demand by Main Processing Section 20 user.

In Step 230, ComServer Software 201 activates the Billing and Administrative System 373 database. This database stores information regarding all valid Providers 12, their respective Provider Sections 10, and corresponding passwords and security levels.

In Step 235, ComServer Software 201 accesses Billing and Administrative System 373 database to lookup and determine whether the calling party is a valid Provider Section 10.

Step 240 shows an example of a calling party dialing into Main Processing Section 20.

In Step 245, ComServer Software 201 determines whether to allow the calling party to connect to Main Processing Section 20 based upon the security password and security level.

In Step 250, ComServer Software 201 disconnects from invalid calling parties. In one embodiment, ComServer Software 201 records the calling party phone number along with a date-stamp and time-stamp in the Billing and Administrative System 373 database. Finally, ComServer Software 201 prepares to scan and detect the next calling party.

In Step 255, ComServer Software 201 connects to valid Provider 12 and grants Subscriber Section 30 access to the Main Processing Section 20. ComServer Software 201 then responds to Provider 12 request to receive Provider Data File 115.

In step 260, ComServer Software 201 determines which Provider 12 MPS Incoming Data Box 355 should be used and begins storing Provider Data File 115.

In Step 270, ComServer Software 201 sends a Data Transmission Receipt 202 to Provider Section 10. This receipts tells Provider 12 whether Provider Data File 115 transmitted successfully. Finally, ComServer 201 disconnects from Provider 12 and prepares for the next caller.

ComServer Software 201 is used to support the telecommunication links necessary to receive MidFormat Files 342 from Provider Section 10 to Main Processing Section 20 may be one such as RipTerm (TeleGrafix Communications Inc., Huntington Beach, Calif.). A simple user interface that gives the necessary instructions to the telecommunications software to carry out the previously tasks may be assembled by well-known methods using software such as RipPaint (TeleGrafix Communications Inc., Huntington Beach, Calif.).

Validation, as shown in Step 235 is performed in any of a variety of ways. In one embodiment, Main Processing Section 20 employs the caller identification method to determine whether the caller is valid. By this caller ID method, the telephone number of any party attempting to establish connection with Main Processing Section 20 is screened by Main Processing Section 20 by matching the telephone number of the caller to a list of valid Provider numbers. This valid number list is maintained by a database internal to Main Processing Section 20, to ensure that the calling party is a valid Provider Section 10. If the telephone number is not that of a valid Provider Section 10, Main Processing Section 20 does not establish a connection, and Main Processing Section 20 time-stamps, date-stamps, and records that invalid phone number. If the number captured, on the other hand, represents a valid Provider Section 10, Main Processing Section 20 allows the transfer of Provider Data files 115 from Provider 10 to Main Processing Section 20.

In an alternative embodiment, Main Processing Section 115 prompts Provider Section 10 for a valid log-in name and/or a password. The password is preferably changed frequently. The entry of a log-in name and/or password may be automatic or manual on the part of Provider Section 10.

In an alternative embodiment, data transmission is initiated by a call from Main Processing Section 20 to Provider Section 10, rather than vice-versa.

In an alternative embodiment, a connection between Provider Section 10 and Main Processing Section 20 is established upon securing access through existing security systems such as a Firewall.

In an alternative embodiment, the "call-back" method is used. In this case, Provider Section 10 establishes a connection with Main Processing Section 20. Main Processing Section 20 verifies the validity of Provider Section 10 by means such as those described above. The communication link is then disconnected. Next, Main Processing Section 20 calls back to, and connects with Provider Section 10, and proceeds to download Provider Data Files 115: The need for a call to be returned by the prospective data recipient (in this case, Main Processing Section 20) provides an additional measure of security to the system.

In alternative embodiments, any combination of the above mentioned validation/security methods are used. For example, the "caller ID" method may be used to determine the origin of a call. If the calling number is deemed valid, then Provider Section 10 is prompted by Main Processing Section 20 to provide a log-in name and password.

If the transmission is successful, Main Processing Section 20 puts the data into a specified MPS Incoming Data Box 355 and a successful data transmission receipt is transmitted to Provider Section 10. Main Processing Section 20 simultaneously creates and records a successful data transmission receipt, which is stored in a database within Main Processing Section 20. Each successful data transmission receipt has a unique transmission tracking number assigned to it. This tracking number is generated by Main Processing Section 20 for audit purposes. In addition to the unique transmission tracking number, each successful data transmission receipt contains a date and time stamp, the file name, and the file size. The cumulative set of successful data transmission receipts enable those individuals who service Main Processing Section 20 to monitor the performance of the system, and to serve as a medium for historical/legal purposes.

In an alternative embodiment, Main Processing Section 20 generates a successful data transmission receipt created at Provider Section 10 location, and which is then sent to Main Processing Section 20 and to Data Provider History Box 135 by default, if no command to the contrary is returned from Main Processing Section 20.

Once data 118 is received by Provider Section 10, Main Processing Section 20 stores and archives the data provided by Provider Section 10 in it's original, Data Provider's Format. Storage media employed by Main Processing Section may include magnetic and non-magnetic storage devices including, but not limited to hard disks, tapes, magneto-optical disks, compact disks and memory chips. Of course, other forms of data storage are known in the art, and it will be appreciated by persons of ordinary skill in the art in light of the teachings of this invention, such other forms of data storage may be readily used.

FIG. 6A describes one embodiment for carrying out the processes that occur at Main Processing Section 20. PrepServer Software 354 is the specialized operating system of Main Processing Section 20 that performs functions including, but not limited to data capture, data translation, data forwarding, Subscriber Section 30 billing, error tracking, and data and system security.

Additionally, PrepServer Software 354 works along side operating systems such as DOS (Microsoft Corporation, Redmond, Wash.), Netware (Novell, Inc. Provo, Utah), and UNIX to perform functions herein described.

The PrepServer Software 354 begins in step 352. Once initiated, PrepServer Software 354 is instanced and assigned, in step 353, a set of MPS Incoming Data Boxes 355 to patrol.

In one embodiment, PrepServer Software 354 continuously scans MPS Incoming Data Boxes 355 of each Provider Section 10, searching for new data files in step 357.

In an alternative embodiment, PrepServer Software 354 scans MPS Incoming Data Boxes 355 of each Provider Section 10 at predefined times.

In another alternative embodiment, PrepServer Software 354 scans all of MPS Incoming Data Boxes 355, but the scanning is manually initiated.

In yet another alternative embodiment, PrepServer Software 354 is dormant until it is triggered by a signal announcing that new data has been successfully received.

In step 356, PrepServer Software 354 scans its assigned MPS Incoming Data Boxes 355, looking for Provider Data Files 115 to be processed. Step 357 defines the collection of MPS Incoming Data Boxes 355 that PrepServer Software 354 is assigned to patrol. Step 358 discerns whether a Provider Data File 115 was found and is available. If no Provider Data File 115 is available, then step 359 is invoked, in which PrepServer Software 354 scanning is completed. If a Provider Data File 115 was found, and is available, step 360 is invoked. In this step, PrepServer Software 354 discerns the identity of Data Provider 113 and determines which PreProcessor 363 is needed, based upon which MPS Incoming Data Box contains a Provider Data File 115, or by Destination Address 117 residing inside of Provider Data File 115.

PreProcessor Directory 363 warehouses the various specialized Preprocessors, thus functioning as a type of database that holds actual programs rather than just representational data. Once it has been determined which particular PreProcessor 363 is needed to translate from the particular Provider Data Format of the Provider Data File 115 found, PreProcessor Directory 362 is accesses to retrieve the appropriate Pre-Processor 363 in step 361. Next, Work Area 365 is blanked or cleared in preparation for use by PreProcessor 363 in step 364. Step 366 represents data being moved to and from Work Area 365 where data processing occurs. Work Area 365 is a temporary directory that is dedicated to the need for PrepServer Software 354 to have an area of information storage in which data can be manipulated.

In an alternative embodiment, PreProcessor 363 is capable of translating similar Midformat files 342. Such a PreProcessor 363 derives it's capabilities by accessing a resource database which describes how to translate the given MidFormat Files 342. The resource database describes information in MidFormat Files 342 such as the included fields, the size of a given field, and the type of data. This results in one PreProcessor 363 being used to translate any similar MidFormat Files 342 from any provider. In the best case, there would be one PreProcessor 363 to translate all Midformat files 368. In addition to PreProcessor 363 and support libraries, a graphical editor is used to create and modify the resource database used by such a PreProcessor 363. This allows PreProcessor 363 systems to be quickly set up to add and translate new Midformat files 342.

Because of the scalability of Main Processing Section 20, multiple PrepServer Software 354 programs, as well as multiple PrepServer Hosts 78, may be operated simultaneously.

Data processing involves PreProcessor 363 translating Provider Data Files 115 to a MidFormat, storing the resultant MidFormat Files 342, counting the number of transactions in MidFormat, and finally returning Success Flag 369, or a Failure Flag 370 to PrepServer Software 354, indicating whether or not PreProcessor 363 successfully translated Provider Data File to which it had been assigned. These last events occur within step 367 of FIG. 6A. Further details of one embodiment of PreProcessor 363 function are shown in FIG. 6B.

FIGS. 6B and 6C describe a method and data structures used in an embodiment for creating MidFormat File 342 from a Provider Data File 115.

In step 301, PreProcessor 363 is selected and sent into operation by PrepServer Software 354.

In step 305, PreProcessor 363 gets Subscriber ID 308 located in Provider Data File 115 header. This is done by looking in a given byte location for a sequence of bytes making up Subscriber ID 302, or by finding a attribute value pair and returning the value found.

In step 310, using Subscriber ID 302, PreProcessor 363 gets Subscriber Job Number 311 from Subscriber Table 314. In one embodiment, PreProcessor 363 accesses Subscriber Table 314, a database table or file such as one created in Paradox (Borland, Scotts Valley, Calif.) to get Subscriber Record 307, then returns Subscriber Job Number 311 from that record.

In step 315, using Subscriber ID 308 and Subscriber Job Number 311, a unique filename is generated for MidFormat File 342. In one embodiment, a unique filename is generated by using a three letter Subscriber ID as a prefix, and appending a five letter job number after first incrementing it. For example, if Subscriber ID is "AAA" and the job number is "00000", then the unique filename produced would be "AAA00001". Note the job number is incremented and saved for the next time a unique filename must be generated. Also note the job number is using a base-36 notation, whose values belong in the set [0–9A–Z]. This means the number of unique filenames which can be generated for this one Subscriber Section 30 is 36 to the 5th power, i.e. approximately 60.4 million filenames. Of course, a wide variety of other file naming schemes, such as the many known in the art, may also be used.

In step 320, PreProcessor 363 creates an empty MidFormat File 342 in Work Area 365, in order to serve as a matrix in which translated data is placed.

In step 325, PreProcessor 363 obtains Subscriber Translation Information 312 from Subscriber Table 314. Subscriber Translation Information 312 describes the format of Provider Data File Transactions 302, which collectively constitute most of Provider Data File 115, and which PreProcessor 363 translates to MidFormat File Transactions 304. Subscriber Translation Information 312 includes the names, types and sizes of the fields it will be accessing in Provider Data File Transaction 302, and serves as an interpretive guide by which PreProcessor 363 can completely read Provider Data File 115. Attribute-value pairs may also be used to describe the fields found in Provider Data File Transaction 302.

In step 330, PreProcessor 363 attempts to get a Provider Data File Transaction 302 from Provider Data File 115. If it finds one, it continues to step 335 to translate the found transaction, in which PreProcessor 363 manipulates Provider Data File 115 according to the rules specified in PreProcessor 363. Such rules may include, but are not limited to, instructions for the transposition of specific fields, and other known means for accomplishing file format translation. If a Provider Data File Transaction 302 is not found, PreProcessor 363 assumes the end of Provider Data File 115 is reached, and proceeds to step 350.

In step 335, using Subscriber Translation Information 312 found on Subscriber Table 308, PreProcessor 363 takes a Provider Data File Transaction 302 and generates the equivalent MidFormat File Transaction 304. In step 340, the generated MidFormat File Transaction 304 is written to MidFormat File 303. Once PreProcessor 363 successfully manipulates the data file, the resulting data file is now called MidFormat File 342. The data file is called "MidFormat" because is in a standard format from which it can be ultimately converted into any destination format.

In step 345, a counter keeping track of the number of transactions processed so far is incremented. After this is done, PreProcessor 363 returns to step 330 and attempts to obtain the next Provider Data File Transaction 302. In step 350, PreProcessor 363 cannot find any more Provider Data File Transactions 302 to process, so it records the number of transactions it processed in Transactions Table 313, and returns to PrepServer Software 354 in step 352.

Returning to FIG. 6A, in step 371, if PreProcessor 363 returns Success Flag 369 in step 371, then step 370 is invoked. In step 370 PrepServer Software 354 distributes MidFormat File 342 from Work Area 363 to the appropriate MPS Outgoing Data Boxes 371, using Subscriber Destination Address 117 as a guide. 371A, 371B and 371C are examples of different Subscriber Outgoing Data Boxes 371, each dedicated to a specific file type and Subscriber 33. After the distribution occurs, PrepServer Software 354 updates Billing and Administrative System 373 with Subscriber Transaction Count 374 in step 372. Billing and Administrative System 373 is a database containing a listing of Subscribers and relevant account information that allows subscribers to be appropriately billed for theft usage of the herein described system. This usage count is continually updated in step 375. In Step 376, PrepServer Software 354 moves Provider Data file 115 from MPS Incoming Data Box 355 to MPS History Box 377. PrepServer Software 354 has then completed it's process.

If PreProcessor 363 returns Failure Flag 370, however, step 378 is invoked, in which PrepServer Software 354 updates Error Log 379 with a report of PreProcessor 363 Failure flag 370. In step 380, PrepServer Software 354 moves Provider Data File 115 from MPS Incoming Data Box 355 to MPS Failed Data Box 373. PrepServer Software 354 has then completed it's processing.

In step 368, PreProcessor 363 sends a response to PrepServer Software 354 indicating that either a successful translation has occurred or has not occurred. In one embodiment, the final task of PreProcessor 363 is to submit a response, such as the answer "1" signifying a successful translation or such as the answer "0" signifying an unsuccessful translation.

In an alternative embodiment, the computer operating system, such as DOS, signifies the success or failure of the translation. Upon successful completion of PreProcessor, operating systems such as DOS return a default response of the answer "1". This response is then interpreted by PrepServer Software 354 to perform subsequent events. Upon a failure to complete execution of PreProcessor 363, operating systems such as DOS return a default response of the answer "0". This response is then interrupted by PrepServer Software 354 to provide error messages to the administrator of PrepServer Software 354.

In the event that a data file 115 fails to move from MPS Incoming Data Box 355, or fails to move from Work Area 365 to MPS Outgoing Data Box 371 the data file is moved to the Failed Data Box. The Failed Data Box is an area which triggers a user error report and screen display specifying that a movement of data has occurred and that examination is necessary to rectify the error.

Numerous failures can occur while data processing. These events include, but are not limited to failures in hardware, software, power supply, and of telecommunication lines. In the event that a data translation fails, the data file is moved from Work Area 365 to a Failed Data Box subdirectory. The Failed Data Box subdirectory is an area which triggers a user error report and/or screen display specifying that a translation error has occurred and that examination is necessary to rectify the error. The failure is triggered by PreProcessor 363 or by the operating system as previously discussed.

In step 370 PreProcessor 363 moves MidFormat File 342 from Work Area 365 to the correct MPS Outgoing Data Box 371. PrepServer Software 354 selects which MPS Outgoing Data Box 371 is appropriate in the manner previously discussed.

Additionally, PrepServer Software 354 creates a unique transaction assigned to each specific MidFormat File 342. This transaction contains a unique transaction tracking number. This tracking number is generated by PrepServer Software 354 for audit purposes. Additionally, this unique transaction contains a date-stamp, time stamp, the file name, and the file size. The cumulative set of successful data transmission receipts enables the user of Main Processing Section 20 to monitor the performance of the system, and to serve as a medium for historical/legal purposes.

The system utilizes numerous internal databases. These internal databases store historical and referential data about security, data transmission, PrepServer Software 354, PreProcessors 363, translations, Providers Sections 20, Subscriber Sections 30, billing information, data tests later to be described, and internal system logs.

Provider Sections 20 and Subscribers Sections 30 are collectively referred to as "customers", and the database that contains information about them is called the Customer Definition Table (see Table 1). The purpose of this database is to store relevant information about the customers such as the customer's name, customer's identification, address, etc.

The database of Incoming Data Boxes 355 and Outgoing Data Boxes 371, is referred to as the Mail Box Database. The purpose of this database is to store relevant information about which customers own the mail boxes, where the mail boxes reside, which PreProcessor 363 performs work on the data contained in the mail box, etc., as shown, for example, in Table 2. From the moment that a data file arrives from Provider Section 10, the data file's ultimate destination is predetermined—it will go to a single specific Subscriber Section 30.

In one embodiment, PrepServer Software 354 recalls from the internal database containing the successful transmission data receipts which MPS Incoming Data Box 355 the data file originally arrived in. Each Incoming Data Box 355 is assigned to only one Subscriber Section 30, to only one transaction type, and to only one MPS Outgoing Data Box 371 with a specific transaction type. Hence, a Subscriber Section 30 may have many MPS Outgoing Data Boxes 371 assigned to it and each Outgoing Data Box 371 representing a single specific type of transaction. For example, Subscriber X might have one MPS Outgoing Data Box 371 assigned to him for holding his cleared bank check files, and a MPS Outgoing Data Box 371 for holding his payroll data files. Because both boxes are reference to the same party, however, they will be correctly transmitted to the same, appropriate Subscriber Section 30.

In an alternative embodiment, PrepServer Software 354 detects the appropriate destination from MidFormat File 342 characteristics other than a Subscriber Destination Address 117. Such characteristics include but are not limited to the file name, the file size, the file header, and the file trailer. By such cues, PrepServer Software 354, in one embodiment, determines the target MPS Outgoing Data Box 371 and moves MidFormat File 342 to that specific box. In an alternative embodiment, PrepServer Software 354 detects from the Provider's 12 log-in name and or log-in password the MPS Outgoing Data Box 371 to select. Based upon the log-in name and or log-in password, PrepServer Software 354 then selects the corresponding MPS Outgoing Data Box 371 based upon a database of log-in names and/or log-in passwords with corresponding MPS Outgoing Data Boxes 371, and moves the MidFormat File 342 to the target box. In an alternative embodiment, Provider Section 10 specifies which Outgoing Data Box 371 to use, and PrepServer Software 354 records this information. Based upon this data box identity, PrepServer Software 354 looks up the target data box and puts MidFormat File 342 into the appropriate MPS Outgoing Data Box 371. In yet an additional alternative embodiment, a combination of these alternatives is used to determine the MPS Outgoing Data Box 371.

Table 3 shows some aspects of a database entitled Usage—Transactions Table for Tracking and Accounting. This database contains records of transactions, each transaction representing a translation to MidFormat that has been performed, when it occurred, when it was transmitted, and other such pertinent information.

Another internal database customer. Specifically, each receipts for each customer. Specifically, each transaction contains information such as the number of transactions that have been translated, the date and time processed, and the identity of the Subscriber. The transactions in this database form the basis for customer billing purposes as well as for audit and legal purposes.

A database called the Sys_log, such as the example shown in Table 4, defines the database of transactions for each warning and error that occurs in Main Processing Section 20. For example, all telecommunication links, whether coming in or out, are recorded and date stamped, as are attempts to access the ComServer Host 76A and ComServer Software 201 without valid phone numbers, log-in names, and passwords.

Another database called Batchnum, such as the example shown in Table 5, defines the transaction tracking number assigned to each data transmission receipt. The purpose of this table is store, assign, and increment a unique number each time a data transmission receipt is sent to a Provider Section 10 and Subscriber Section 30.

Another database contains all data transmission receipts. The purpose of this table is to keep a record of all receipts for audit and legal purposes. Each transaction is date and time stamped, has a unique batch number assigned to it, the file size transmitted, and a description of whether the transfer was successful or not.

Referring again to FIG. 7, in step 405, ComServer Software 201 is started by the user of Main Processing Section 20.

In step 410, ComServer Software 201 continuously scans modems 54 and multiplexers 74 for a Subscriber Section 30. In an alternative embodiment, ComServer Software 201 scans modems 54 and multiplexers 74 for a Subscriber Section 30 at predetermined time intervals. In an alternative embodiment, ComServer Software 201 scans modems 54 and multiplexers 74 for a Subscriber Section 30 at the command of the Main Processing Section 20 user.

In Step 415, ComServer Software 201 determines whether a Subscriber Section 30 is calling Main Processing Section 20.

In Step 420, ComServer Software 201 determines a call is not made.

In Step 425, ComServer Software 201 is terminated at predefined times.

In an alternative embodiment, ComServer Software 201 is terminated on demand by MPS 20 user.

In Step 430, ComServer Software 201 activates the Billing and Administrative System 373 database. This database stores the identity and information about all valid Subscriber Sections 30, their corresponding passwords and security levels, and their use of the system described in this patent application.

In Step 435, ComServer Software 201 accesses Billing and Administrative System 373 database to lookup and determine whether the calling party is a valid Subscriber Section 30.

Step 440 shows an example of a calling party dialing into the Main Processing Section 20.

In Step 445, ComServer Software 201 determines whether to allow the calling party to connect to Main Processing Section 20 based upon the security password and security level.

In Step 450, ComServer Software 201 disconnects from invalid calling parties. ComServer Software 201 records the calling party phone number along with a date-stamp and time-stamp in the Billing and Administrative System 373 database. Finally, ComServer Software 201 prepares to scan and detect the next calling party.

In Step 455, ComServer Software 201 connects to valid Subscriber Section 30 and grants Subscriber Section 30 access to the Main Processing Section 20. ComServer Software 201 then responds to Subscriber Section 30 request to transmit the MidFormat File 368.

In step 460, ComServer Software 201 determines which Subscriber Section 30 that MPS Outgoing Data Box 371 should be used and begins transmitting Midformat File 368 in Outgoing Data Box 371.

In Step 470, ComServer Software 201 sends a Data Transmission Receipt 402 to Subscriber Section 30. This receipts tells Subscriber Section 30 whether Midformat File 368 transmitted successfully. Finally, ComServer 201 disconnects from Subscriber Section 30 and prepares for the next caller.

This section describes how Main Processing Section 20 notifies Subscriber Section 30 and Main Processing Section 20 database that a successful data transmission has occurred. Prior to initiating contact with Subscriber Section 30, Main Processing Section 20 places data into Outgoing Data Box 371. A successful data transmission is signaled to Main Processing Section 20 by a response produced by the modem protocol. Most standard modem protocols, including X, Y, and Z modem protocols, have internal error checking means that will carry out this task for Main Processing Section 20.

Upon successfully transmitting MidFormat File 342 and the completion of the data transmission protocol, Main Processing Section 20 moves MidFormat File 342 from MPS Outgoing Data Box 371 to a MPS History Box.

As PrepServer Software 354 moves MidFormat File 342 from MPS Outgoing Data Box 371 to MPS History Box, a successful data transmission receipt is transmitted to Subscriber Section 30. Main Processing Section 20 simultaneously creates and records a successful data transmission receipt stored in Main Processing Section 20 database. Each Successful data transmission receipt has a unique transmission tracking number assigned to it. This tracking number is generated by Main Processing Section 20 for audit purposes. In addition to the unique transmission tracking number, each successful data transmission receipt contains a date and time stamp, the file name, and the file size. The cumulative set of successful data transmission receipts enable the user of Main Processing Section 20 to monitor the performance of the system, and to serve as a medium for historical/legal purposes.

In an alternative embodiment, Main Processing Section 20 generates a successful data transmission receipt which is sent to Main Processing Section 20, and to a Subscriber Section 30 History Box by default, if no command to the contrary is returned from Main Processing Section 20.

FIG. 8 shows a detail of one embodiment of the processes occurring within Block 500 of FIG. 3, primarily, Subscriber Section 30 receiving and storing MidFormat Files 368 from Main Processing Section 20. In one embodiment, Subscriber Section 30 initiates contact with Main Processing Section 20 with telecommunications link 21, for example by modem. Subsequently, Subscriber Section 30 is identified by Main Processing Section 20, and assessed as to whether the link is with a valid subscriber. Unless the call is deemed to be valid, the downloading of MidFormat Files 342 form Main Processing Section 20 does not begin.

In one embodiment, Main Processing Section 20 employs the caller identification method. By this caller ID method, the telephone number of any party attempting to establish connection with Main Processing Section 20 will be obtained by methods and devices well known in the art. The number obtained is screened by Main Processing Section 20 by matching the telephone number of the calling party to a list of valid Subscriber Section 30 telephone numbers. This valid number list is maintained by a database internal to Main Processing Section 20 to ensure that the calling party is a valid Subscriber Section 30. If the number is not that of a valid Subscriber Section 30, Main Processing Section 20 does not establish a connection, and Main Processing Section 20 time-stamps, date-stamps, and records that invalid phone number. If the number captured, on the other hand, represents a valid Subscriber Section 30, Main Processing Section 20 allows the transfer of the appropriate MidFormat Files 342 to Subscriber Section 30.

In an alternative embodiment, Main Processing Section 20 prompts Subscriber Section 30 for a valid log-in name and/or password. The entry of a log-in name and/or password may be automatic or manual on the part of the user of Subscriber Section 30.

In an alternative embodiment, data transmission is initiated by the call of Main Processing Section 20 to Subscriber Section 30, rather than vice-versa.

In another alternative embodiment, a connection between Subscriber Section 30 and Main Processing Section 20 will be established upon securing access through existing security systems such as a Firewall.

In an alternative embodiment, the "call-back" method is used. In this case, Subscriber Section 30 establishes a connection with Main Processing Section 20. Main Processing Section 20 verifies the validity of Subscriber Section 30 by means such as those described above. Telecommunication Link 21 is then disconnected. Next, Main Processing Section 20 calls back to, and connects with Subscriber Section 30, and then proceeds to transfer the appropriate MidFormat Files 342 to Subscriber Section 30. The need for a call to be returned by the prospective data source (in this case, Main Processing Section 20), provides an additional measure of security to the system.

In alternative embodiments, any combination of the above mentioned validation/security methods are used. For example, the "caller ID" method may be used to determine the origin of a call. If the calling number is deemed valid, then Subscriber Section 30 is prompted by Main Processing Section 20 to provide a log-in name and password.

Using a modem, for example, Subscriber Section 30 can either directly download MidFormat File 342 from Main Processing Section 20, or receive this information using electronic mail. Any of a variety of modem protocols may be used, such as X, Y, or Z modem protocols. Of course, there are other non-modem means of electronic data transmission known in the art that are also suitable for this purpose. A single modem can be used to transmit data to Subscriber Sections 30. Alternatively, a multiplexer can be used to handle several simultaneous transmissions to multiple Subscriber Sections 30. A multiplexer is a device well known in the art, which networks several modems and telephone lines together. Such devices are commonly available. Examples include the "Wildcat BBS IM, MultiPort Multiplexer (Mustang Software, Bakersfield, Calif.)

The software used to support the Telecommunication Links 21 necessary to transfer Midformat Files 342 from Main Processing Section 20 to Subscriber Section 30 may be one such as RipTerm (TeleGrafix Communications Inc., Huntington Beach, Calif.). A simple user interface that gives the necessary instructions to the telecommunications software to carry out the previously described tasks may be assembled by well known methods using software such as RipPaint (TeleGrafix Communications Inc., Huntington Beach, Calif.).

MidFormat File 342 may be received by Subscriber Section 30 using a combination of security techniques, including, but not limited to data encryption and security measures internally employed by Main Processing Section, to be later described. Methods of data encryption are well known in the art. Examples of data encryption methods include RSA Data Security's (Redwood City, Calif.) software solutions, and the use of the proposed "Clipper" chip hardware solution.

Alternative methods of communication between separately located sections of this system include the use of on-line services such as CompuServe, America Online, Prodigy, or infrastructures such as the Internet, each with their respective electronic mail and file transfer capabilities.

In another alternative embodiment, non-modem transmission means such as ISDN, and Internet IP/FTP transmit the data from Main Processing Section 20 to Subscriber Section 30.

FIG. 9 represents one embodiment of the functions performed by PostProcessor 601 at Subscriber Section 30. PostProcessor 601 functions include recording the data transmission receipt, detecting MidFormat File 342, reading MidFormat File 342, translating the data in the file, validating the data in the file, appending information onto the data, inserting the data into the Subscriber's Application Software 620, and generating warning and errors displayed via the screen and paper reports.

In one embodiment, the user manually starts the telecommunication download process from within Subscriber's Application Software 620 in step 540. Once Midformat File 342 is successfully is downloaded, the Telecommunication Software 542 automatically disconnects, and automatically initiates PostProcessor 601.

In an alternative embodiment, the user manually starts the telecommunication download process in Subscriber's Application Software 620. Once MidFormat Files 342 are successfully downloaded, the user of Subscriber Section 30 quits telecommunication package and manually starts PostProcessor 601.

In yet an additional embodiment, the user manually starts the telecommunication download process as an independent process outside of Subscriber's Application Software 620. An example of this method is using America Online's telecommunications software and interface to download a file previously uploaded to America Online by Main Processing Section 20. Once MidFormat File 342 is successfully downloaded, the user quits the Telecommunication Software 542 (in this example, America Online's package) and manually starts PostProcessor 601 to perform the tasks previously described.

Step 610 shows PostProcessor 601 recording Data Transmission Receipt 603. This receipt serves to provide the user of Subscriber Section 30 with acknowledgment that MidFormat File 342 has been either successfully or unsuccessfully downloaded and to let the user of Subscriber Section 30 know that the telecommunication download processing phase is complete. Additionally, Data Transmission Receipt 603 is stored in Transmission Receipt Database 607 to enable the user of subscriber Section 30 to subsequently review previous downloads for auditing and accounting purposes.

In step 620, PostProcessor 601 searches for Midformat File 342. PostProcessor 601 detects the correct MidFormat File 342 by searching for a specific file name and/or looking up the specific file name in a specific data directory.

In step 625, PostProcessor 601 begins performing several tasks, starting with reading MidFormat File 342. In step 630, PostProcessor 601 subsequently records the data transmission receipt, displaying to the user of Subscriber Section 30 that a successful or unsuccessful data file exists. This process also involves discerning and displaying to the user of Subscriber Section 30 whether the MidFormat File 342 is the correct file, and discerning whether the data inside the file is complete and correct by using tests such as check sums, algorithms and other such tests, as is known in the art.

If any single one or a combination of these test results indicate that there is a problem with the data set, PostProcessor 601 halts all tasks. PostProcessor 601 then displays and/or print out a Warning/Error Report. Additionally, PostProcessor 601 suggests appropriate solutions to the problems listed in the Warning/Error Report. Each problem that can occur in PostProcessor is given a unique warning and error number and these warning and error numbers are stored in a PostProcessor 601 database along with the related suggested remedy(s). PostProcessor 601 provides remedy suggestions by looking up the warning/error number associated with each warning or error in the database, and displaying or printing the corresponding interpretations and suggested remedies.

In step 630, PostProcessor 601 reads MidFormat File 342 into memory where it manipulates MidFormat File 342 data in order to perform a format translation. The data manipulation is performed by a set of instructions provided by PostProcessor 601 source code. Each unique PostProcessor 601 has a specific set of manipulation instructions which are suited to the type of MidFormat File 342 being translated—for example whether it represents cleared bank checks, or payroll transactions—and the Destination Format required by Subscriber's Application Software 620. Such instructions may include format translation methods such as the rearrangement of data fields, the substitution of data fields using look up tables, the re-representation of numeric formats, the creation of data fields based upon PostProcessor 601 tests, the creation of data fields based specified by the user, the creation of data fields based upon lookup tables, the creation of data fields based upon Subscriber's Application Software 620, and other widely known data manipulation functions known in the art.

Additionally, PostProcessor 601 places the transactions in the format required by Subscriber's Application Software 620. This format, in any specific case, is generically referred to herein as Destination Format. These databases and database formats include but are not limited to BTrieve, Oracle, Sybase, Informix, Platinum, Great Plains, Solomon, Macola, Intuit, and other flat file and relational databases.

In step 635, one or more tests are performed to validate the data. One validation test is to compare the total transactions, dollar amounts, and other specified fields to control totals either in MidFormat File 342 or that are derived by PostProcessor 601.

A second test is to validate each field in a given transaction against data held within Subscriber's Application Software 620. This audit test helps to ensure that transactions and or data fields belong to the particular Subscriber Section 30.

Another test involves using calculations such as algorithms. These tests involve specific calculations, such as $A+B/C$, $A^2+B^2=C^2$, $2A^2+4B^2+$ the square root of $3C=X$, etc., that compare a data field or combination of data fields in the transaction against specified data in PostProcessor 601, or against specified data provided by the user of Subscriber Section 30, or against specified data from within Subscriber's Application Software 620. Another test involves Boolean logic routines, such as "less than", "greater than", "greater than or equal to". These routines compare a field or combination of fields in the transaction against specified data in PostProcessor 601, against specified data generated by PostProcessor 601, against specified data provided by the user of Subscriber Section 30, or against specified data provided by Subscriber's Application Software 620.

Another test involves statistical data. PostProcessor 601 generates statistics based upon a single or a combination of fields in MidFormat File Transactions 337. PostProcessor 601 then compares these statistics against specified data in PostProcessor 601, or against other specified data generated by PostProcessor 601, or against specified data provided by the user of Subscriber Section 30, or against specified data provided by the Subscriber's Application Software 620.

Of course, any combination of the above-described Boolean logic, statistical, and/or calculation/algorithm—based methods may be employed. In the event that a warning or an error occurs from one or a combination of these tests, the warning(s) or errors(s) are displayed and or printed to the user subsequent to the insertion of the transactions that are valid.

These statistics can be displayed or printed for the user of Subscriber Section 30 for monitoring transactions, data fields, or combinations of transactions and data field statistics. The comparison of these statistics can then be used for threshold warnings and errors, historical monitoring, projections, and Test Results Report 612, as shown in step 640.

In step 645, Test Result Database 617 stores the Boolean logic and statistical calculations and algorithms employed by PostProcessor 601. In step 650, PostProcessor 601 begins inserting valid transactions into Subscriber's Application Software 620. Any transactions that are not valid are isolated into a separate file. The user of Subscriber Section 30 is notified of these exceptions in Warning/Error Report 627 and/or Test result Report 612. The invalid transactions can subsequently be reviewed by the user of Subscriber Section 30 to create, edit, delete, and save the transactions and or fields. These tasks may be performed within the transaction browsing option of PostProcessor 601.

In an alternative embodiment, PostProcessor 601 begins inserting all valid and invalid transactions into Subscriber's Application Software 620. PostProcessor 601 generates a Warning/Error Report 627 and/or Test Result Report 612 notifying the user of Subscriber Section 30 that warnings and/or errors have been inserted into Subscriber's Application Software 620. These reports provide the user of Subscriber Section 30 with a report detailing each transaction that requires the user of Subscriber Section 30 to review the transaction in Subscriber's Application Software 620 and suggest possible solutions, by means previously described.

In another alternative embodiment, PostProcessor 601 inserts all valid and invalid transactions into Subscriber's Application Software 620 and does not provide warning and/or error reports.

In yet another alternative embodiment, PostProcessor 601 inserts only valid transactions into Subscriber's Application Software 620 and PostProcessor 601 generates a report of invalid transactions.

In all of these embodiments, PostProcessor 601 inserts the transactions into the file formats required by Subscriber's Application Software 620.

Once the User of Subscriber Section 30 quits PostProcessor 601 and initiates the Subscriber's Application Software 620, all of the transactions will show up in that application. Subscriber Application Software 640 include, but are not limited to relational databases, non-relational databases, and flat file programs. Examples of these databases include Btrieve, Oracle, Sybase, and XBase. Examples of software applications using these databases include Platinum, Great Plains, Macola, Solomon, and Quicken.

The resultant data may be stored by any mans known in the art, including, but not limited to hard disks, tapes, magneto-optical disks, compact disks, memory chips. Of course, other forms of data storage are known in the art, and are applicable within the framework of this invention.

After PostProcessor 601 has completed all of its tasks, the end result is that transactions have been automatically entered into Subscriber's Application Software 620 and have been verified and validated, as if the user had manually reviewed, calculated, verified, looked-up and cross referenced, and entered the transactions manually. Use of the invention has made this process much faster, more accurate, and less expensive.

The following is an example scenario of a Subscriber using the invention herein described. In this example, the Subscriber is using accounting software such as Platinum (Platinum Software, Irvine, Calif.) as the Subscriber's Application Software, and the Subscriber wants to automate the processes of data transfer, translation, analysis, and entry for payroll and bank statement reconciliation. The Subscriber, in this example has his payroll processed by a commercial payroll processing company such as Automated Data Processing (ADP) Inc.(Roseland, N.J.). The Subscriber also uses a bank, such as Bank of America (San Francisco, Calif.), for it's general checking account. In this example, the payroll processing company and the bank participate in the use the invention herein described, and therefore each have a Provider Section 10 as part of their in-house computer systems, with which they serve as Data Providers 12.

The process begins when the bank and the payroll processing company each use their respective Provider Section 10 computer systems to generate their Provider Data Files 115. Examples of Provider Data Files 115 for payroll and bank statement reconciliation, are shown in Tables 7 and 8, respectively. Once the Provider Data Files 115 have been created, the Data Providers each use their respective Provider Section Telecommunications Software 142 to transmit the data files to Main Processing Section 20.

Once Main Processing Section 20 successfully receives the Provider Data Files 115 from the Provider Section 10, Main Processing Section 20 performs tasks such as determining which subscriber the Provider Data File 115 belongs to, translates the files into MidFormat files 342, and performing subscriber billing tasks. Examples of the MidFormat Files 342 are shown in tables 9 and 10. Once these tasks have been completed the MidFormat Files 342 containing the statement information and the payroll information, are placed into the proper Outgoing Data Box 371.

At this point, the subscriber of our example uses Subscriber Telecommunication Software 542 to dial into Main Processing Section 20, and download the two MidFormat Files 342. The subscriber then starts Postprocessor 601 for Payroll. This program performs tasks which include validating, calculating, translating, importing, and reporting. This process is then repeated using PostProcessor 601 for bank statement reconciliation. Examples of Destination Format Files 610 are shown in Tables 11 and 12.

Payroll data has been automatically entered into the accounting software application general ledger, eliminating the need for this data to be entered manually. Subsequently, the subscriber enters the general ledger module of the accounting application software, and prints out an exception report. In this example, the exception report flags the subscriber that a certain employee received and inappropriate amount of money in his last paycheck, and that another certain employee's salary expense was allocated to a non-existent account number.

Bank statement data has been automatically entered into the bank book module of the accounting software application, eliminating the need for this data to be entered manually. The subscriber then enters the bank book module of the accounting software application and prints out reports to examine if any unusual transactions occurred. In this example scenario, a check that does not belong to the subscriber, and a check amount that does not agree with the bank statement amount have been flagged for the subscriber to review.

In summary, the invention herein described eliminates several manual tasks, and substantially reduces the high labor cost associated with these manual tasks. The system is unique for several reasons. First, this invention provides for data exchange between an unlimited number of Data Providers and Subscribers, at a cost several times lower than possible using conventional systems. Second, the system is designed to rapidly connect and configure new Data Providers and Subscribers, as a opposed to other systems, which require months or years to implement. Third, the system provides integral means for sophisticated and intelligent data analysis.

The method and apparatus of the present invention are described above with reference to specific embodiments. Other embodiments will be apparent to those of ordinary skill in the art. It is therefore not intended that this invention be limited except as indicated by the appended claims.

TABLE 1

| CUSTOMER | Master Customer Definition Table | |
|---|---|---|
| Customer ID | 6 Alphanumeric | * Drives internal AR billing system (Platinum AR) |
| Customer Name | 40 Alphanumeric | |
| Contact Person | 30 Alphanumeric | |
| Address 1 | 30 Alphanumeric | |
| Address 2 | 30 Alphanumeric | |
| City | 40 Alphanumeric | |
| State | 2 Alphanumeric | |
| Country | 15 Alphanumeric | |
| Zip Code | 10 Alphanumeric | |
| Voice Number | 10 Alphanumeric | |
| Fax Number | 10 Alphanumeric | |
| Credit Card Name | 20 Alphanumeric | |

TABLE 1-continued

| CUSTOMER | Master Customer Definition Table |
|---|---|
| Credit Card Number | 20 Alphanumeric |
| Credit Card Expir Date | 4 Alphanumeric |
| Credit Card Holder Name | 30 Alphanumeric |

TABLE 2

| MAILBOX | Master Mailbox Definition Table | |
|---|---|---|
| Mailbox ID | 11 Alphanumeric * | |
| Customer ID | 6 Alphanumeric | |
| File Server | 47 Alphanumeric | |
| Disk Volume | 15 Alphanumeric | |
| Directory Path | 80 Alphanumeric | |
| Box Type | 1 Alphanumeric | Source (S) or Target (T) |
| PreOrPost Processor | 12 Alphanumeric | |

TABLE 3

| USAGE | Transactions Table for Tracking and Accounting | |
|---|---|---|
| Batch ID | 12 Alphanumeric * | |
| Customer ID | 6 Alphanumeric | |
| Provider ID | 6 Alphanumeric | |
| Data Import Date | 6 Date | NOTE: IN PARADOX, DATE |
| Data Import Time | 8 Alphanumeric | — |
| Transmission Status | 20 Alphanumeric | AND NUMERIC FIELDS |
| Data Transmission Date | 6 Date | DO NOT ACTUALLY |
| Data Transmission Time | 8 Numeric | USE THE FIELD SIZE; |
| Target Data Module | 2 Alphanumeric | INCLUDED FOR CONSISTENCY. |
| Number of Headers | 8 Numeric | |
| Number of Line Items | 8 Numeric | Time (A8) is "HH:MM:SS" |

TABLE 4

| SYS_LOG | System Log File - Used by PrepServer and Overlays | |
|---|---|---|
| Entry Date | 6 Date * | |
| Entry Time | 8 Alphanumeric * | Time (A8) is "HH:MM:SS" |
| Comment | 80 Alphanumeric | |

TABLE 5

| BATCHNUM | Incrementing Batch ID Number-Only 1 record and 1 field |
|---|---|
| Last Batch Number | 8 Numeric |

TABLE 6

PreProcessor Command-Line Arguments

Here is a sample usage message put out by the PP, describing the arguments it can use.
pp01 ver 1.0 - ADP PreProcessor for Subscriber OCLASSEN
usage: pp01 [-log logfile] [-verbose] [-report] [-usetabs]
  datafile [work dir]
  where: log = name of alternate system logfile
  verbose = output verbose statements
  report = output human readable report
  usetabs = output spreadsheet ready report

TABLE 6-continued

PreProcessor Command-Line Arguments datafile = Raw Transaction File (RTF) to translate
work dir = Directory to process RTF in.

Note: "pp01" Should be replaced with the name of the PP "ver 1.0" Should be replaced with the appropriate version "ADP" Replaced with the actual provider name the PP is designed for.
"OCLASSEN" Replaced with the actual Subscriber name the PP finds in the RTF.

TABLE 7

Example Payroll File Layout from Data Provider

| | | |
|---|---|---|
| 8L201MAR3194032694909 | | |
| 8L201 | 1021-0001PR03314-0019106664 | NET PAY |
| 8L201 | 1021-0001PR03314+0000000003 | NET PAY |
| 8L201 | 1140-0001PR03314-0000047028 | DENTAL INSURANCE |
| 8L201 | 1150-0001PR03314-0000052000 | EMPLOYEE LOANS |
| 8L201 | 1900-0001PR03314-0000349241 | EMPLOYEE ADVANCE |

TABLE 8

Example Bank File Layout from Data Provider 319761,02,02,93,10141010,Employee Group Dental,000817.00
319777,02,02,93,10141010,Employee Group Medical,000103.69
319735,02,02,93,10141010,Employee Group WAS,000152.38
319741,02,02,93,10141010,Supplemental WAS,000092.35
036565,03,03,93,10211020,Employer Group Dental,000012.00

TABLE 9

Example Payroll Midformat File Layout

Subj: ADP midformat data
Date: 94-08-22 23:28:00 EDT
From: Santa Clara ADP
To: Intermedia Partners
Intermedia Mid-Format data file

The standardized midformat should have the
following characteristics:

| # Field Name | Field Length |
|---|---|
| # Customer Key | 10 |
| # Account Number | 32 |
| # Payroll Date | MM/DD/YY |
| # Debit/Credit | 5 |
| # Description | 15 |

"001", "1021-0001", "03/31/94",, "-", "191066.64",
" NET PAY"
"001", "1021-0001", "03/31/94",, "+", "0.03", "NETPAY"
"001", "1140-0001", "03/31/94",, "-", "470.28",
"DENTAL INSURANCE"
"001", "1150-0001", "03/31/94",, "-", "520.00",
"EMPLOYEE LOANS"
"001", "1900-0001", "03/31/94",, "-", "3492.41",
"EMPLOYEE ADVANCE"

TABLE 10

Example Bank Midformat File Layout

Subj: ADP midformat data
Date: 94-08-22 23:28:00 EDT
From: Santa Clara ADP
To: Intermedia Partners
Intermedia Mid-Format data file

TABLE 10-continued

Example Bank Midformat File Layout

```
# The standardized midformat should have the
following characteristics:

# Field Name                Field Length

# Customer Key              10
# Check Number              10
# Check Date                MM/DD/YY
# Check Transit Number      15
# Check Amount              15
„"005", "319761", "02/02/93",, "10141010", "817.00", "
„"005", "319777", "02/02/93",, "10141010", "103.69", "
„"005", "319735", "02/02/93",, "10141010", "152.38", "
„"005", "319741", "02/02/93",, "10141010", "92.35", "
„"005", "036565", "03/03/93",, "10211020", "12.00", "
```

TABLE 11

Example Payroll Destination File Layout

```
1021", "0001", "IP", "NET PAY", "03/31/94", "03/31/94", "3767",
"3", ", "191066.64", "
1021", "0001", "IP", "NET PAY", "03/31/94", "03/31/94", "3767",
"3", ", "0.03", "
1140", "0001", "IP", "DENTALINSURANCE", "03/31/94", "03/31/94",
"3763", "3", ", "470.28", "
1150", "0001", "IP", "EMPLOYEE LOAN", "03/31/94", "03/31/94"",
"3767", "3", ", "520.00", "
1900", "0001", "IP", "EMPLOYEE ADV", "03/31/94", "03/31/94",
"3767", "3", ", "3492.41", "
```

TABLE 12

Example Bank Destination File Layout

```
„"319761", "2", "01/15/93", "1000", "0100", "", "817.00", "817.00",
"Y", "Y", ", "", "02/02/93",,"
„"319777", "2", "01/15/93", "1000", "0100", "", "103.69", "103.69",
"Y", "Y", ", "", "02/02/93",,"
„"319735", "2", "01/15/93", "1000", "0100", "", "152.38", "152.38",
"Y", "Y", ", "", "02/02/93",,"
„"319741", "2", "01/15/93", "1000", "0100", "", "92.35", "92.35",
"Y", "Y", ", "", "02/02/93",,"
„"036565", "2", "02/15/93", "1000", "0100", "", "12.00", "12.00",
"Y", "Y", ", "", "03/03/93",,"
```

What is claimed:

1. A method for handling a data set from a source over a communications channel, said method comprising the steps of:

receiving said data set from said source over said communications channel;

selecting one particular processing procedure, from among a plurality of possible processing procedures, for processing said data set based only a first predetermined information item and predetermined processor selection rules;

processing said data set to generate a processed data set using said selected processing procedure;

selecting a destination for said data set from among a plurality of possible destinations for routing said data set based only on a second predetermined information item and predetermined destination selection rules; and communicating said data set to said selected destination over said communications channel.

2. The method in claim 1, wherein said first information item and said second information item are each independently selected from the set consisting of; an information item identifying a data set originator, an information item identifying a data set destination, an information item identifying a data set content type, and combinations thereof.

3. The method in claim 1, wherein said first information item and said second information comprise an information item identifying a data set originator.

4. The method in claim 1, wherein said first information item and said second information comprise an information item identifying a data set content type.

5. The method in claim 1, wherein said first information item an information item identifying a data set originator; said data set is stored in an in-box in a first memory associated uniquely with said data set originator, and said data set is stored in an out-box in a second memory uniquely associated with said selected destination.

6. The method in claim 1, further comprising the step of recording in a data history storage region an indication of the occurrence of at least one of said steps of receiving, selecting one particular processing procedure, processing, selecting a destination, and communicating.

7. The method in claim 1, wherein said step of selecting a processing procedure comprises selecting a data set format translation procedure.

8. The method in claim 1, wherein said step of selecting a processing procedure comprises selecting a business rule processing procedure.

9. The method in claim 8, wherein said business rule processing procedure includes a financial accounting procedure.

10. The method in claim 1, further comprising the step of performing a validating test of said processed data set with said received data set to verify the integrity of said data.

11. The method in claim 10, wherein said test includes comparing specified fields with control totals.

12. The method in claim 10, wherein said test includes comparing each field in a given transaction data set against data stored within predetermined Application software associated with a subscriber, thereby ensuring that data fields belong to the particular subscriber.

13. The method in claim 10, wherein said test includes mathematical calculations.

14. The method in claim 10, wherein said test includes boolean comparisons.

15. The method in claim 10, wherein said test includes statistical comparisons.

16. The method in claim 6, further comprising the steps of:

establishing a unique association between said data set and a destination address identifier;

appending said destination address identifier to said data set to accompany said data set for identifying the data set destination;

using said appended destination address identifier to track and direct the flow of said data set.

17. The method in claim 16, wherein said association is provided by a data set originator identifier.

18. The method in claim 1, further comprising the step of recording event information in an event log, including the steps of:

pre-identifying a particular event for which each occurrence of said event is to be recorded in said event log;

designating a data storage region in a data storage means for storing data;

defining a data structure in said data storage means for storing event information;

continuously monitoring events to detect the occurrence of said particular event;

recording, upon detection of said occurrence, said occurrence in said data structure.

19. The method in claim 1, further comprising the step of identifying occurrence of a predetermined event including the steps of:

pre-identifying characteristics of particular events for which an alert signal is to be generated;

continuously monitoring said communications channel for incoming data sets to be received;

examining each said incoming data set received; and generating an alert signal when said examining indicates that a particular data set has characteristics corresponding to said pre-identified characteristics.

20. The method in claim 1, further comprising the steps of automatically counting and reporting said count of the number of transactions processed of a given type and identified to a particular identity wherein said particular identity is selected from the set consisting of a data originator identity, a data destination identity, and combinations thereof.

21. The method in claim 1, further comprising the steps of:

recording in a data history memory storage region an indication of at least one of said steps performed on said data;

performing a validating test of data in said data set;

tracking and directing the movement of said data set including the steps of:

establishing a unique association between said data set and a destination address for said data set;

appending said destination address identifier to said data set to accompany said data set for identifying the destination to whom said data set is to be communicated after processing; and using said appended destination address identifier to track and direct the flow of said data set;

recording event information in an event log, including the steps of;

pre-identifying a particular event for which each occurrence of said event is to be recorded in said event log;

designating a data storage region in a data storage;

defining a data structure in said data storage for storing event information;

continuously monitoring events to detect the occurrence of said particular event; and recording, upon detection of said occurrence, said occurrence in said data structure;

identifying occurrence of a predetermined event including the steps of:

pre-identifying characteristics of particular events for which an alert signal is to be generated;

continuously monitoring said communications channel for received data;

examining said received data; and generating an alert signal when said examining indicates that a particular data has characteristics corresponding to said pre-identified characteristics; and automatically counting and reporting said count of the number of transactions processed according to predetermined counting and reporting rules.

22. The method in claim 21, wherein said processor is a data set format translator.

23. The method in claim 21, wherein said input data set comprises a financial data set including a financial account identifier and monetary credits and debit data pertaining to said identified financial account.

24. The method in claim 1, wherein said source format data file is a provider format data file, said second format file is a mid-format file, and said first destination is a main processing section of said computer system.

25. The method in claim 1, further comprising the step of identifying an occurrence of a predetermined event, including the steps of:

pre-identifying characteristics of at least one particular event for which an alert signal is to be generated;

examining said data for an occurrence of said pre-identified characteristics according to predetermined examination rules;

generating an alert signal when said examining indicates that a particular data has characteristics corresponding to said pre-identified characteristics.

26. The method in claim 25, wherein said pre-identified examining rules include monitoring at periodic intervals.

27. The method in claim 25, wherein said pre-identified examining rules include monitoring continuously.

28. The method in claim 26, wherein said pre-identified characteristics include examining said data for a characteristic that deviates from a first predefined chacteristic by more than a specified deviation value.

29. The method in claim 28, wherein said first predefined characteristic is a monetary value, and wherein said specified deviation value comprises a monetary deviation from said monetary value.

30. A system for routing a data set received from a source over a communications channel, said system comprising:

means for receiving said data set from said source over said communications channel;

a first memory for storing a plurality of processing routines;

logic means for identifying the originator of said data set based on an information item associated with said data set;

(E) logic means for identifying a data content type from said data set;

processor selector means for selecting one particular processing procedure from among said plurality of possible processing procedures stored in said memory means, to process said data set based only a first predetermined information item and predetermined processor selection rules;

a processor for processing said data set using said selected processing procedure;

destination selection logic for selecting a destination to which said data set is to be communicated from among a plurality of possible destinations for routing said data set based only on only on a second predetermined information item and predetermined destination selection rules;

a communications channel for selectably communicating said data set to said, selected destination.

31. The system in claim 30, wherein said communications channel comprises busses internal to a single computer.

32. The system in claim 30, further comprising:

means for simultaneously monitoring a plurality of incoming data files from a plurality of internal and external data sources;

means for determining whether the incoming data should be processed;

means for automatically self-initiating processing of valid incoming data files without external command and control inputs;

means for discerning valid data files from all files received and for managing a data file queue of said received valid data files;

means providing a period knowledge of an incoming data file's source and destination format and for using said a prior knowledge to rapidly and efficiently process said incoming data file without external intervention or iterative feedback from the source file;

means for triggering particular processing routines for processing corresponding files said processing routines providing data file location specifications and data file processing specifications for said processing;

means for verifying the integrity of a data file;

means for creating a useable target data file without iteratively monitoring said target data file and source data file formats;

means for processing multiple diverse data files and data file formats simultaneously;

means for generating a target file independent of the physical presence of the source file within said system;

means for processing files from source to target file types without using any intermediate file format;

means for locating and identifying particular data files in selected file directories;

means for processing data in said selected file directory;

means for moving data to another directory, and means for record the movement from said first selected directory to said another directory in a log, said means for recording including means for recording multiple moves involving any single source data file.

* * * * *